United States Patent
Horlbeck et al.

(10) Patent No.: US 9,200,981 B2
(45) Date of Patent: Dec. 1, 2015

(54) METHODS AND APPARATUS FOR ENGINE ANALYSIS USING INTERNAL ELECTRICAL SIGNALS

(71) Applicant: Thompson Automotive Labs, LLC, Fuquay Varina, NC (US)

(72) Inventors: Eric G. Horlbeck, Chapel Hill, NC (US); John Thompson, Fuquay Varina, NC (US); Emery Carr, Carrboro, NC (US); Allen C. Eberhardt, Raleigh, NC (US)

(73) Assignee: Thompson Automotive Labs LLC, Fuquay Varina, NC (US)

( * ) Notice: Subject to any disclaimer, the term of this patent is extended or adjusted under 35 U.S.C. 154(b) by 0 days.

(21) Appl. No.: 13/835,067

(22) Filed: Mar. 15, 2013

(65) Prior Publication Data
US 2013/0340512 A1 Dec. 26, 2013

Related U.S. Application Data

(63) Continuation-in-part of application No. PCT/US2012/050127, filed on Aug. 9, 2012.

(60) Provisional application No. 61/521,934, filed on Aug. 10, 2011, provisional application No. 61/641,493, filed on May 2, 2012.

(51) Int. Cl.
*G01M 15/11* (2006.01)
*G01M 15/12* (2006.01)
(Continued)

(52) U.S. Cl.
CPC .......... *G01M 15/12* (2013.01); *F02D 41/1497* (2013.01); *G01L 1/10* (2013.01); *G01L 5/00* (2013.01); *G01M 15/11* (2013.01);
(Continued)

(58) Field of Classification Search
CPC .............. G01M 15/11; G01M 15/12; F02D 2200/1015; F02D 41/1498; F02D 41/1497; F02D 2041/288
USPC ........................................ 73/114.02
See application file for complete search history.

(56) References Cited

U.S. PATENT DOCUMENTS 4,083,234 A  4/1978 Aono et al.
4,424,709 A  1/1984 Meier, Jr. et al.
(Continued)

OTHER PUBLICATIONS

International Search Report and Written Opinion mailed Oct. 16, 2012 for International Application No. PCT/US2012/050127 (19 pages).

(Continued)

*Primary Examiner* — Freddie Kirkland, III
(74) *Attorney, Agent, or Firm* — Myers Bigel Sibley & Sajovec, P.A.

(57) ABSTRACT

A method of analyzing an engine for misfire activity includes receiving an electrical signal associated with a plurality of cycles of the engine, identifying energy spikes in the electrical signal associated with cylinder firings in the engine, generating engine speed estimates based on spacing between the energy spikes, and analyzing anomalies in the engine speed estimates to identify misfire activity in the engine. Also described is a method of analyzing an engine for misfire activity including receiving an electrical signal associated with the engine, detecting AC ripple in the electrical signal, generating engine speed estimates in response to the detected AC ripple, and analyzing anomalies in the engine speed estimates to identify misfire activity in the engine.

23 Claims, 27 Drawing Sheets

(51) Int. Cl.
*F02D 41/14* (2006.01)
*G01L 1/10* (2006.01)
*G01L 5/00* (2006.01)
*F02D 41/28* (2006.01)

(52) U.S. Cl.
CPC ..... *F02D2041/286* (2013.01); *F02D 2041/288* (2013.01); *F02D 2200/1015* (2013.01)

(56) References Cited

U.S. PATENT DOCUMENTS

| | | | |
|---|---|---|---|
| 5,425,269 A | 6/1995 | Bradshaw | |
| 5,495,774 A * | 3/1996 | Klauber et al. | 73/862.333 |
| 5,503,007 A | 4/1996 | Plee et al. | |
| 5,668,725 A | 9/1997 | Naik | |
| 5,687,082 A * | 11/1997 | Rizzoni | 701/111 |
| 5,758,307 A | 5/1998 | Haefner et al. | |
| 6,067,847 A | 5/2000 | Staerzl | |
| 6,222,445 B1 | 4/2001 | Beckhusen | |
| 6,223,120 B1 | 4/2001 | Williams | |
| 6,338,326 B1 | 1/2002 | Ebeling et al. | |
| 6,651,490 B1 | 11/2003 | Ceccarani | |
| 6,810,320 B2 | 10/2004 | Yamamoto et al. | |
| 6,883,497 B2 | 4/2005 | Wozniak et al. | |
| 6,892,691 B1 | 5/2005 | Uhl et al. | |
| 7,031,828 B1 | 4/2006 | Thompson et al. | |
| 7,142,972 B1 | 11/2006 | Naik | |
| 7,155,965 B2 | 1/2007 | Kim | |
| 7,162,397 B2 * | 1/2007 | DeCarlo et al. | 702/190 |
| 7,171,302 B2 * | 1/2007 | DeCarlo et al. | 701/114 |
| 7,292,933 B2 | 11/2007 | Christensen | |
| 7,324,888 B1 | 1/2008 | Stotsky | |
| 7,334,552 B2 * | 2/2008 | Moller et al. | 123/192.1 |
| 7,530,261 B2 * | 5/2009 | Walters | 73/114.04 |
| 7,536,902 B2 * | 5/2009 | Tsukamoto et al. | 73/114.04 |
| 7,540,185 B2 | 6/2009 | Lewis | |
| 7,571,640 B2 | 8/2009 | Andrews | |
| 7,591,170 B2 * | 9/2009 | Lin et al. | 73/105 |
| 7,614,290 B2 * | 11/2009 | Shikama et al. | 73/114.25 |
| 7,788,020 B2 | 8/2010 | Wolf et al. | |
| 7,801,671 B1 | 9/2010 | Pederson et al. | |
| 8,091,410 B2 * | 1/2012 | Malaczynski | 73/114.04 |
| 8,256,278 B2 * | 9/2012 | Lee et al. | 73/114.04 |
| 8,392,096 B2 * | 3/2013 | Mathews et al. | 701/111 |
| 8,471,742 B2 * | 6/2013 | Lachartre | 341/138 |
| 2005/0251321 A1 | 11/2005 | DeCarlo et al. | |
| 2007/0079785 A1 | 4/2007 | Moller et al. | |
| 2007/0157713 A1 | 7/2007 | Tsukamoto et al. | |
| 2008/0098806 A1 | 5/2008 | Shikama et al. | |
| 2008/0190184 A1 | 8/2008 | Walters | |
| 2010/0042311 A1 * | 2/2010 | Nakai | 701/112 |
| 2011/0072893 A1 | 3/2011 | Malaczynski | |
| 2011/0253101 A1 * | 10/2011 | Mathews et al. | 123/406.27 |
| 2014/0182548 A1 | 7/2014 | Thompson et al. | |

OTHER PUBLICATIONS

Getman et al, "An Automated Network for Detecting Diesel Engine Misfire", *International Joint Conference on Neural Networks*, 2007, 3017-3021.

International Preliminary Report on Patentability Corresponding to International Application No. PCT/US2012/050127; Date of Mailing: Feb. 20, 2014; 11 Pages.

Jones et al. "A review of condition monitoring and fault diagnosis for diesel engines", *Tribotest*, 6: 267-291, 2000 (Abstract Only).

* cited by examiner

METHODS AND APPARATUS FOR ENGINE ANALYSIS USING INTERNAL ELECTRICAL SIGNALS

RELATED APPLICATIONS

The present application is a continuation-in-part of PCT Application No. PCT/US2012/050127, filed Aug. 9, 2012, entitled "METHODS AND APPARATUS FOR ENGINE ANALYSIS AND REMOTE ENGINE ANALYSIS," which claims the benefit of and priority to U.S. Provisional Patent Application No. 61/521,934, filed Aug. 10, 2011, entitled "METHODS AND APPARATUS FOR ENGINE ANALYSIS," U.S. Provisional Patent Application No. 61/641,493, filed May 2, 2012, entitled "METHODS AND APPARATUS FOR REMOTE ENGINE ANALYSIS," and the disclosures of which are hereby incorporated herein by reference in their entirety.

BACKGROUND

An engine is a device that generates mechanical motion. In general, an engine is any electromechanical device that converts energy, including electrical, chemical, heat, or any other type of energy, into mechanical motion. This includes, for example, internal combustion engines, steam engines, Carnot engines, Stirling engines, etc. A cyclo-mechanical engine is any engine that operates on a cycle to generate mechanical motion.

Internal combustion engines typically have one or more cylinders in which mechanical energy is generated by combustion of flammable materials. In an internal combustion engine, a piston is typically movably positioned within the cylinder and connected to a crankshaft by a rod. The movement of the piston turns the crankshaft providing motive force to the wheels of the vehicle.

Engines typically operate using a four stroke combustion cycle, also known as the Otto cycle. The four strokes are: 1) the intake stroke, where the piston moves from an in position to an out position, drawing fuel and air into the cylinder; 2) the compression stroke, where the piston moves from the out position to the in position, compressing the fuel and air mixture in the cylinder; 3) the combustion stroke, where a spark plug emits a spark, igniting the fuel and air mixture, causing an explosion that propels the piston to the out position; and 4) the exhaust stroke, where the piston moves back to the in position, forcing the exhaust fumes from the cylinder. Valves permit the introduction of fuel and air, and another valve allows the expulsion of the exhaust fumes.

The combustion cycle is made inefficient when a misfire occurs. A misfire is sometimes thought of as the total lack of combustion in a cylinder. More broadly, however, a misfire occurs any time the firing of a cylinder fails to release an expected amount of energy. A misfire, therefore, can be thought of as a total or partial lack of combustion in a cylinder.

Misfires can occur for many different reasons. For example, the spark plug may not be providing a spark to the compressed fuel/air mix. A bad fuel mix, which may be the result of a clogged fuel injector, a clogged air intake, or both, can cause a misfire to occur. Essentially, the fuel and the air are not being introduced into the cylinder in the proper ratio to achieve optimal combustion. A lack of compression, such as when the seals in the cylinder fail and allow the fuel/air mixture to leak out as the piston attempts to compress the mixture, can also lead to a misfire. Many other factors can contribute to a lack of complete combustion.

Misfires are a cause for concern for vehicle operators. When a misfire occurs, the fuel in the cylinder does not combust and is sent out the exhaust valve. This unburned fuel then passes out through the exhaust system of the vehicle. This results in lower fuel efficiency as well as additional wear and tear on catalytic converters.

Misfires, particularly those accompanied by partial combustion, may be difficult to detect.

SUMMARY

A method of analyzing an engine for misfire activity according to some embodiments includes receiving an electrical signal associated with a plurality of cycles of the engine, identifying energy spikes in the electrical signal associated with cylinder firings in the engine, generating engine speed estimates based on spacing between the energy spikes, and analyzing anomalies in the engine speed estimates to identify misfire activity in the engine.

The energy spikes may be associated with spark plug firings in the engine.

Identifying the energy spikes may include filtering the electrical signal with a matched filter to isolate the energy spikes, and discarding outlying spikes.

Generating the engine speed estimates may be performed in response to a crank angle and a time spacing between the energy spikes.

The anomalies may include changes in engine speed, and the method may further include weighting the anomalies based on a magnitude of the change in engine speed.

The electrical signal may include a 12 Volt signal associated with the engine.

A method of analyzing an engine for misfire activity according to further embodiments includes receiving an electrical signal associated with a plurality of cycles of the engine, identifying components of the electrical signal associated with alternator poles in the engine, generating engine speed estimates based on timing of the alternator poles, and analyzing anomalies in the engine speed estimates to identify misfire activity in the engine.

The method may further include filtering the electrical signal to remove DC components from the electrical signal.

Identifying components of the electrical signal associated with alternator poles may include performing a fast Fourier transform of the electrical signal.

The method may further include measuring accelerations of the engine due to cylinder firings derived from the engine speed estimates.

The method may further include determining changes in energy associated with the accelerations of the engine due to cylinder firings, and identifying misfire activity when a change in energy of the engine associated with the accelerations of the engine due to cylinder firings is less than a predetermined amount.

A method of analyzing an engine for misfire activity according to further embodiments includes receiving an electrical signal associated with the engine, detecting AC ripple in the electrical signal, generating engine speed estimates in response to the detected AC ripple, and analyzing anomalies in the engine speed estimates to identify misfire activity in the engine.

Detecting the AC ripple in the electrical signal may include performing a fast fourier transform of a sample of the electrical signal less than 20 ms long and identifying peaks in a spectrum of the electrical signal at a frequency between 700 Hz and 4000 Hz.

The method may further include removing amplitude variations from the sample of the electrical signal by forming an envelope between peaks in the electrical signal and normalizing the electrical signal with respect to the envelope.

The envelope may include a linear envelope.

Generating the engine speed estimates may include performing a short time fourier transform analysis on the electrical signal to track changes in location of spectrum peaks over time.

The method may further include generating a coarse engine speed trace in response to changes in the location of the spectrum peaks, and generating a frequency ratio estimate by dividing an average coarse engine speed by an average short time fourier transform frequency value.

The method may further include identifying anomalies in the engine speed by comparing heights of peaks in the engine speed relative to preceding valleys in the engine speed.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DETAILED DESCRIPTION

Figure 1A:
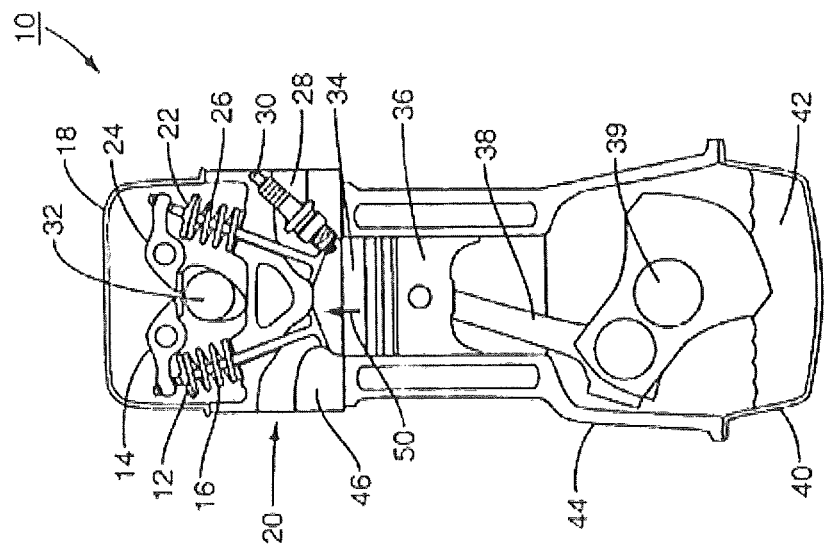
FIGS. 1A to 1D are cross sectional views of an internal combustion engine showing various aspects of a four-stroke engine cycle.

Embodiments of the present invention are described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

There is presently a need for methods and/or apparatus that allow an automotive technician to analyze the performance of an engine. For example, a technician may need to determine if any of an engine's cylinders are misfiring, on vehicles outside the scope of on-board diagnostics (OBD) II regulations, such as heavy duty, diesel and pre-OBD II vehicles. Moreover, there is a need for systems/methods outside of the vehicle's onboard OBD II system that can determine if any of an engine's cylinder(s) are misfiring. It may also be desirable to determine if an engine is running smoothly, with little or no variation in engine speed under constant conditions, such as at idle.

Embodiments of the present invention can be used to analyze many different types of engines. As used herein, the term "engine" includes any engine, motor or other electromechanical device that converts energy, including electrical, chemical, heat, or any other type of energy, into mechanical motion. This includes, for example, internal combustion engines, electric motors, steam engines, Carnot engines, Stirling engines, etc. A cyclo-mechanical engine is any engine that operates on a cycle to generate mechanical motion.

Some embodiments of the invention identify variations in engine speed, which can indicate likely misfire activity and/or other problematic conditions, from any of a variety of signals derived from a running engine that contain information of the repeating patterns of the engine's cycle. An example of such a signal is the sound from the engine's exhaust. However, other signals, such as electrical signals within the vehicles electrical system can be used.

Some embodiments of the invention utilize a combination of remote signal processing (e.g., signal processing performed at the location of the engine) and central processing (e.g., processing performed at a location remote from the engine) for automotive diagnostics. In particular, some embodiments can identify variations in engine speed by collecting engine-related data at the engine and transmitting the data to a remote location for processing. Some pre-processing of the data can occur before it is transmitted to the remote location. Some vehicles include systems that transmit diagnostic data, such as fault codes, collected by an onboard controller in the vehicle to a remote location. However, such systems may not actually process the data to diagnose or analyze the engine.

As an engine operates, it produces a repeating pattern of vibrations and/or electrical/electromagnetic patterns as it repeats its engine cycle. Some embodiments of the invention detect changes to or other characteristics of this repeating pattern to infer instantaneous changes in the speed of the engine. Some patterns of change may indicate misfire activity. Some embodiments provide a process for inferring misfire activity due to the presence of these patterns.

FIGS. 1A to 1D illustrate operation of a four-stroke an internal combustion engine that operates according to the Otto cycle. The engine 10 includes an intake valve 12 controlled in part by a rocker arm 14 and a spring 16. A valve cover 18 may be positioned over the intake valve 12. The intake valve 12 is positioned in an intake port 20. Collectively this forms the intake of the engine. While not illustrated, it should be understood that a fuel injector and an air intake are fluidly coupled to the intake port 20.

On the exhaust side, an exhaust valve 22 is controlled in part by a rocker arm 24 and a spring 26. The exhaust valve 22 is positioned in an exhaust port 28. The valve cover 18 may also cover the exhaust valve 22. A spark plug 30 may be positioned proximate the exhaust valve 22. A camshaft 32 has cam surfaces that sequentially trigger rocker arms 14 and 24 as camshaft 32 rotates.

The intake port 20 and the exhaust port 28 are selectively fluidly connected to the cylinder 34. A piston 36 is positioned within the cylinder 34. The piston 36 is connected to a rod 38 which in turn is connected to a crankshaft 39. The crankshaft 39 dips into oil pan 40 so that oil in oil sump 42 may be used to lubricate the moving parts of the engine 10. The engine 10 is enclosed by engine block 44 and head 46.

During operation, the engine 10 goes through four stages of the Otto cycle. FIG. 1A illustrates the intake stroke. During the intake stroke, the piston 36 moves from an in position to an out position (illustrated generally by arrow 48). Intake valve 12 is open, allowing a fuel and air mixture to flow into the cylinder 34. Exhaust valve 22 is closed.

Figure 1B:
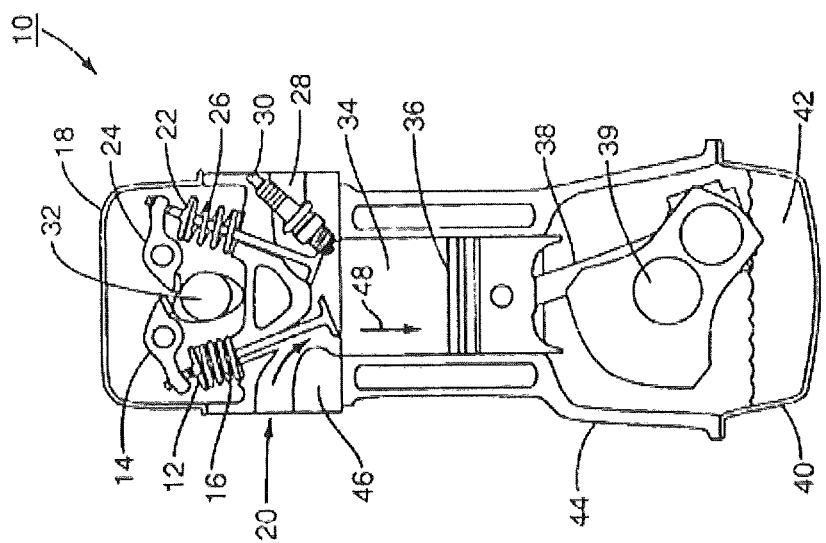

FIG. 1B illustrates the compression stroke. The piston 36 moves from the out position to the in position (illustrated generally by arrow 50). Both the intake valve 12 and the exhaust valve 22 are closed. This compresses the fuel and air mixture.

Figure 1C:
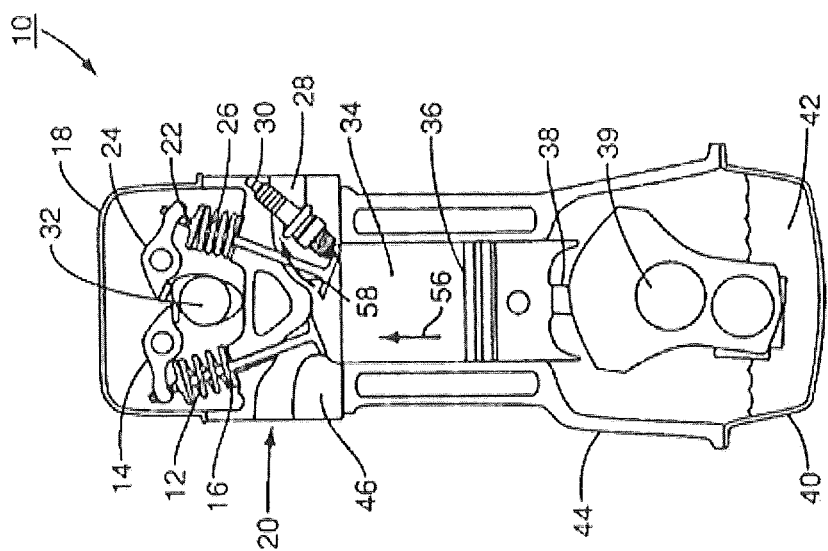

FIG. 1C illustrates the combustion stroke. The spark plug 30 emits a spark 52, which causes the fuel and air mixture to ignite and explode. The force of the explosion pushes the piston 36 to the out position (illustrated generally by arrow 54), which in turn pushes the crankshaft 39 and provides the motive force. Both intake valve 12 and the exhaust valve 22 remain closed.

Figure 1D:
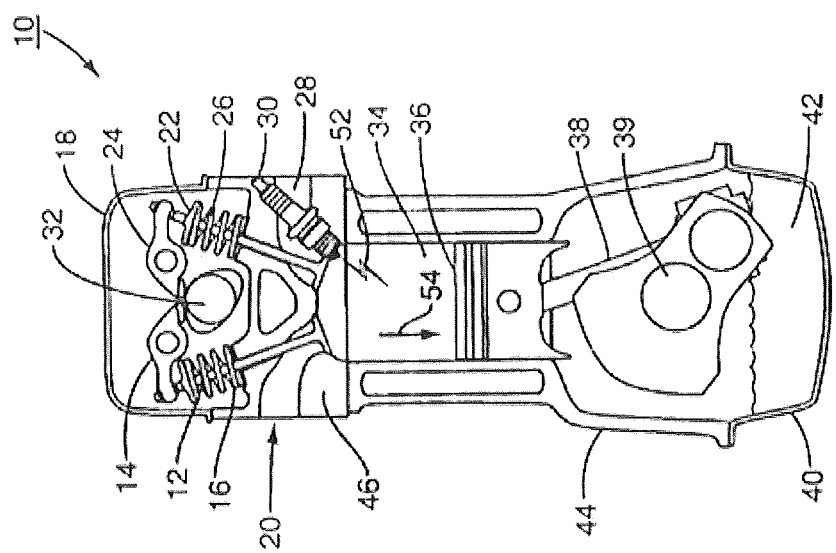

FIG. 1D illustrates the exhaust stroke. The exhaust valve 22 opens, and the piston 36 moves from the out position to the in position (illustrated generally by arrow 56), pushing the contents of the cylinder 34 out through the exhaust port 28 (illustrated generally by arrow 58).

A misfire occurs in the engine 10 when the firing of a cylinder fails to release an expected amount of energy. For example, a misfire may occur when the fuel/air mixture in the cylinder fails to ignite, ignites incompletely, or otherwise fails to increase pressure in the cylinder by an expected amount when it ignites. For example, a misfire can occur if the spark plug fails to provide an adequate spark, if the air/fuel mixture is out of balance, and/or if there is a loss of compression in the cylinder during the compression cycle. A misfire can have a number of detrimental effects, including loss of power, emission of unignited hydrocarbons through the engine exhaust, backfiring, etc.

Figure 2:
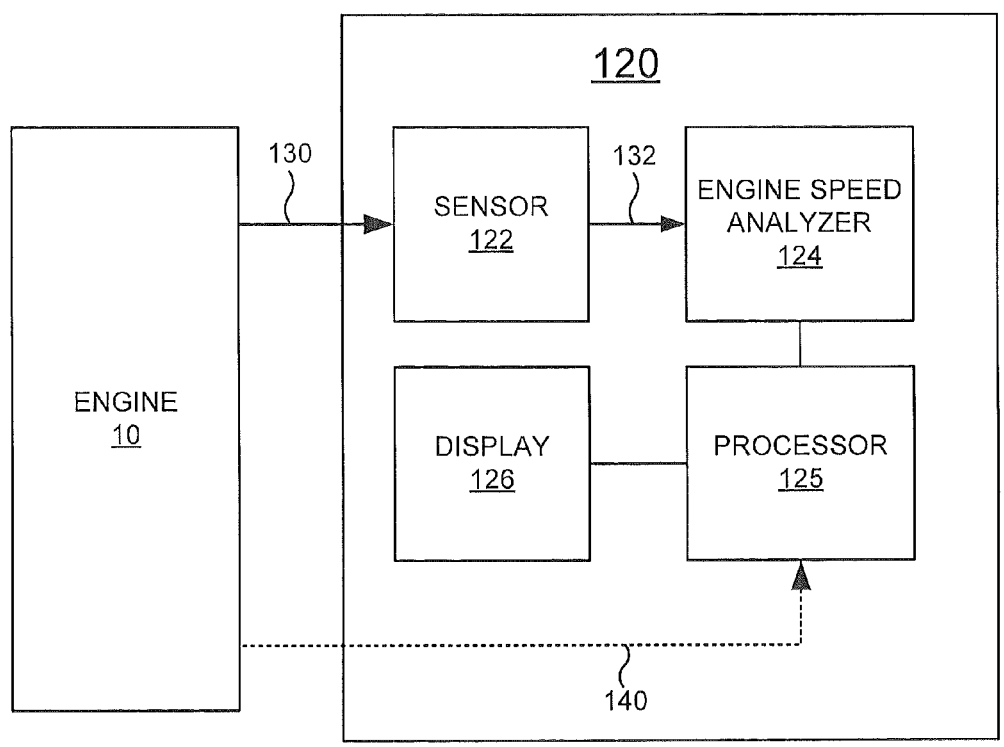
FIG. 2 is a block diagram illustrating an apparatus according to some embodiments.

A system 120 for analyzing an engine according to some embodiments is illustrated schematically in FIG. 2. As shown therein, the system 120 includes a sensor 122 and an engine speed analyzer 124. The sensor 122 may sense a signal 130 associated with an engine 10 and responsively generate a sensor output signal 132, where "associated" means any signal that is generated as a byproduct of engine operation. The signal may in some embodiments be an electronic signal. Alternatively, the sensor 122 can sense a non-electronic signal 130, such as an audible signal, a vibration signal, an electromagnetic signal, etc., associated with the engine 10, and generate the sensor output signal 132 in response to the non-electronic signal. In that case, the sensor 122 can include a transducer that generates an electronic sensor output signal 132 in response to an audible signal 130 associated with the engine 10. The engine speed analyzer 124 analyzes the sensor output signal 132. From this analysis, the engine speed analyzer 124 may identify the occurrence of a misfire condition in the engine 10 as described in detail below.

The signal 130 can be detected using a microphone placed in the exhaust pipe, a directional microphone attached to the vehicle, an airflow sensor in the air intake or exhaust, a MAF sensor, an RF sensor near the engine, a vibration sensor attached to the vehicle, an optical sensor arranged to determine vibration by measuring deflection of a laser, an electrical sensor attached to the electrical system of the vehicle, such as by being plugged into a 12V power outlet. In some embodiments, an optical sensor may be used to measure the movement of a belt, gear, sprocket, timing chain, or other moving part of an engine.

In embodiments in which a sensor on a belt, gear, sprocket, timing chain, or other moving part of an engine is analyzed, it is possible to detect variations in engine speed within a single engine cycle.

The system 120 further includes a processor 125 and a display 126 that can determine and indicate what remediation is appropriate for a detected misfire. For example, the processor 125 can examine the output of the engine speed analyzer 124 and determine what service on the engine is recommended or desired based on the severity of the engine rpm variability or misfire activity. In some embodiments, if the misfire activity indicates that the misfires are likely due to dirty or clogged valves, the processor 125 can identify a strength and/or composition of chemical cleaner that is recommended to remediate the misfire problem for the engine being analyzed. The results may be displayed on the display 126.

The processor 125 may optionally be configured to receive a cylinder timing signal 140 from the engine 10 that may be used to determine a firing order of cylinders in the engine 10. The cylinder timing signal 140 can be obtained, for example from a spark plug connector of one of the cylinders to provide a spark timing point. Alternatively, the cylinder timing signal can be obtained from a cam sensor or crank sensor in the engine 10. By comparing the cylinder timing signal 140 with the analysis of the sensor output signal 132, the processor 125 can identify which particular cylinder(s) are misfiring. This information can be displayed to a user of the system 120 via the display 126.

Figure 3:
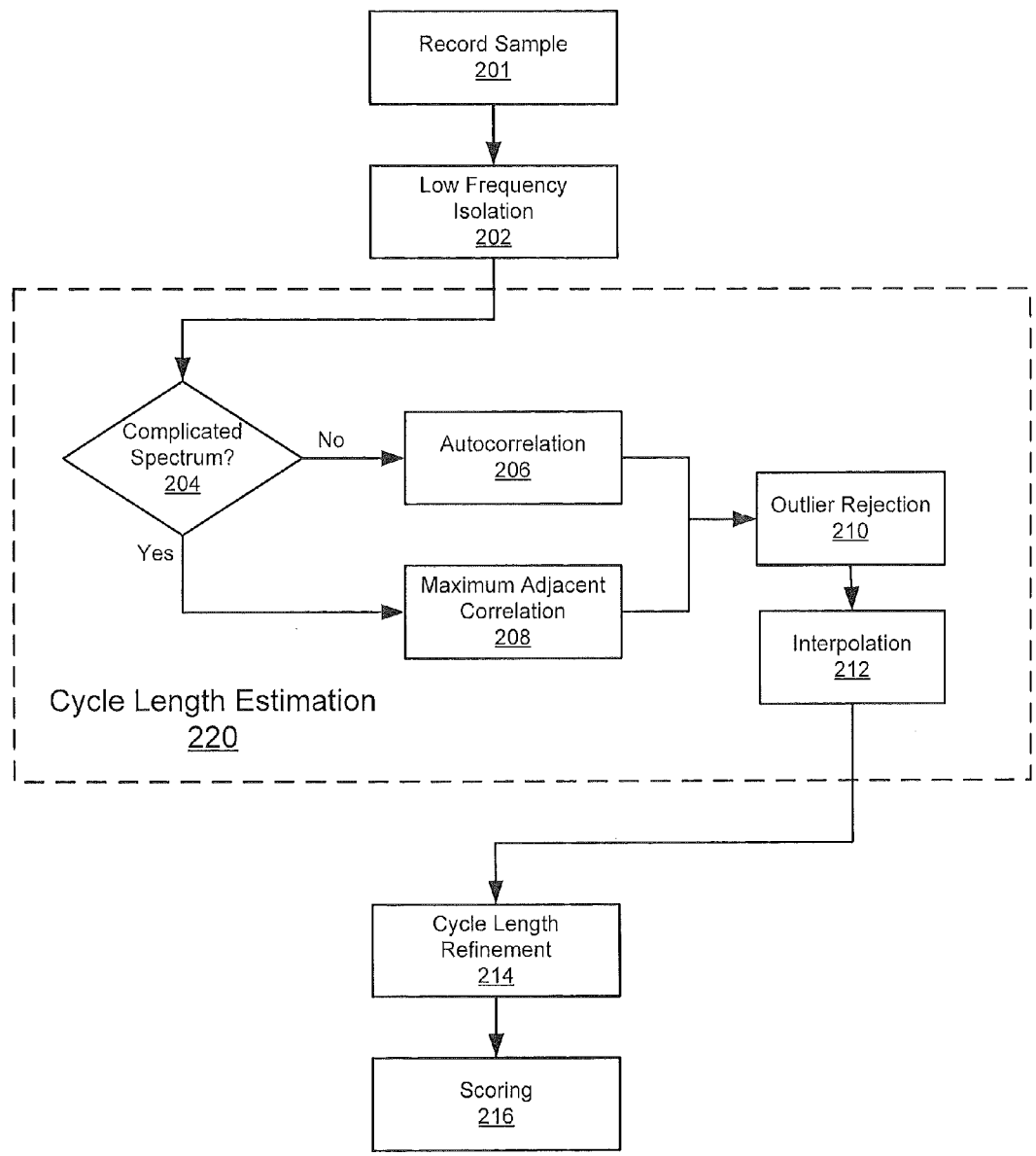
FIG. 3 is flowchart illustrating operations of systems/methods according to some embodiments.

FIG. 3 is a flowchart of operations of a system 12 according to some embodiments. Referring to FIGS. 2 and 3, initially, a sample of the signal 130 output by the sensor 122 is recorded by the misfire analyzer 124 (Block 201). In some cases, a misfire can be detected in a sample of the signal 130 that is less than a second. However, it is typically desirable to record a longer sample. For example, if an engine is misfiring every 20 seconds on the average, it may not be possible to detect a misfire using a measurement sample that is less than 20 seconds long. Some embodiments record a sample of the signal 130 that is about 1 minute long.

The signal 130 can be digital or analog. However, an analog signal may be digitized for analysis. Some embodiments may use a digital audio signal obtained from the engine exhaust sampled at 44,100 Hz. For example, a microphone may be used to detect the sound coming from the exhaust. A signal can also be obtained using (i) a microphone in the intake manifold, (ii) a voltage sensor on the electrical system (including the cigarette lighter), (iii) electromagnetic sensor near the engine (detecting radio signals created by the engine's electrical system), (iv) a microphone near the engine suspended from the raised hood of the vehicle, (v) a piezo sensor (or microphone) attached to the body of the vehicle, and/or any other similar signal acquisition apparatus.

Figure 4:
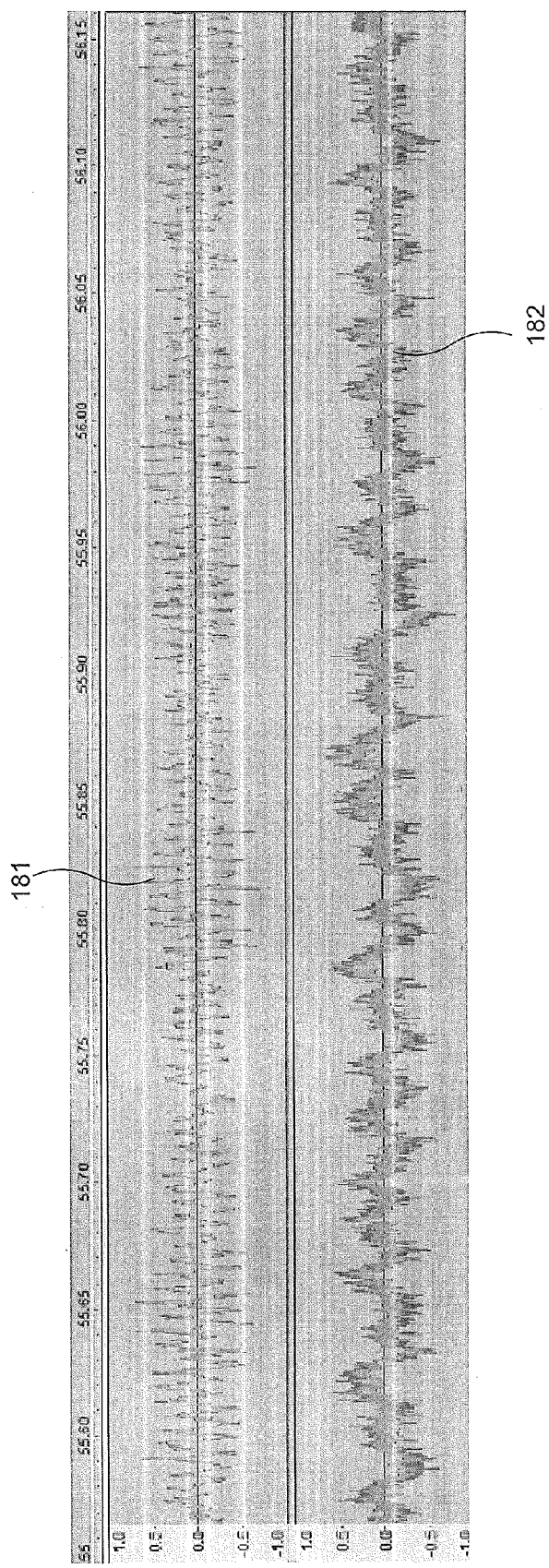
FIG. 4 illustrates an example of an audio signal sample recorded from an engine exhaust, and a DC-adjusted electrical signal sample recorded from a cigarette lighter of a car during engine operation

FIG. 4 illustrates an example of an audio signal sample 181 (upper portion of the graph) recorded from an engine exhaust, and a DC-adjusted electrical signal sample 182 (lower portion of the graph) recorded from a cigarette lighter of a car during engine operation. These samples can be analyzed in accordance with the methods described herein to determine the presence or absence of a misfire condition.

Returning to FIGS. 2 and 3, in preparation for misfire detection, the signal 130 may be filtered using, for example, a low pass filter (Block 202). The signal 130 may include numerous high frequency signal components that correspond to sources other than the 720 degree engine cycle, as well as reflections and resonances in the signal path and other noise. The signal 130 may be passed through a low pass filter to reduce these components of the signal. In general, the low pass filter may have a cutoff frequency selected to be high enough to retain signal components associated with the 720-degree engine cycle yet low enough to reject undesirable signal components, such as high frequency components associated with the presence of stators in the engine's alternator.

In some embodiments, a fourth order Butterworth filter may be applied twice to the signal, once forward in time and then once in reverse to reduce impact on the phase of the signal.

Each direction may have a −3 db cutoff point at a frequency corresponding to 900 RPM, which is expected to be higher than the idle speed of the engine under test. It will be appreciated that the actual cutoff frequency in cycles per second (Hertz) is based on the number of cylinders of the engine. For example, an 8-cylinder engine will experience 8 cylinder firings per 720 degrees of rotation, or four cylinder firings per revolution of the crankshaft. For an 8-cylinder engine, therefore, 900 RPM corresponds to a frequency of 900*4/60 Hz, or 60 Hz.

Accordingly, filter parameters for a fourth order Butterworth filter may depend on the number of cylinders in the engine being analyzed, as shown in Table 1.

TABLE 1

Filter design parameters

| No. of cylinders | Normalized cutoff frequency (in half cycles/sample) |
|---|---|
| 3 | 0.00102040816327 |
| 4 | 0.00136054421769 |
| 5 | 0.00170068027211 |
| 6 | 0.00204081632653 |
| 8 | 0.00272108843537 |

Information about the number of cylinders in the engine may be obtained in some embodiments by scanning and decoding the vehicle identification number (VIN) of the vehicle and/or reading information from the vehicle's OBD II port. The VIN may include information about the vehicle, such as its make, model, year, options, engine type, etc. The systems/methods disclosed herein may choose a particular algorithm, filter parameters, etc., based on information derived from the VIN. In addition, it is possible to look up information about the car in a database using the VIN.

Next, cycle length estimation is performed (Block 220). The length of the fundamental basis cycle of the engine (i.e., the "duration") is then estimated at various times throughout the recorded sample of the signal 130. In the case of a four-stroke engine, for example, the fundamental basis cycle of the engine may correspond to a 720 degree cycle in which each 720 degree cycle corresponds to two rotations of the engine crankshaft. While analysis of a four-stroke engine is described in detail herein, it will be appreciated that the inventive concepts described herein are not limited to analysis of four-stroke engines.

The times at which the engine duration is estimated may be spaced evenly throughout the signal. "Duration" is related to engine speed in revolutions per minute (RPM) as follows. As each 720 degree cycle in a four-stroke engine corresponds to two rotations of the engine crankshaft, the engine speed, in RPM, of a four-stroke engine can be expressed as shown in Equation (1).

Speed (in RPM)=120/Duration (in seconds)   (1)

Thus, for example, an engine having a 720-degree cycle duration of 0.1 seconds is running at 1200 RPM.

In cycle length estimation, the operations first determine if the signal has a complicated spectrum (Block 204). If so, maximum adjacent correlation is performed on the signal 130 as discussed below relative to Block 208. Otherwise, if the signal does not have a complicated spectrum, correlation analysis is performed on portions of the signal as discussed below (Block 206).

Figure 5A:
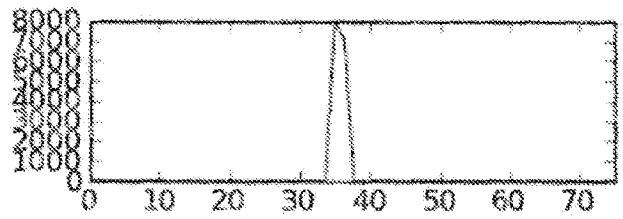
FIGS. 5A-5D illustrate frequency spectra of various signals.
Figure 5B:
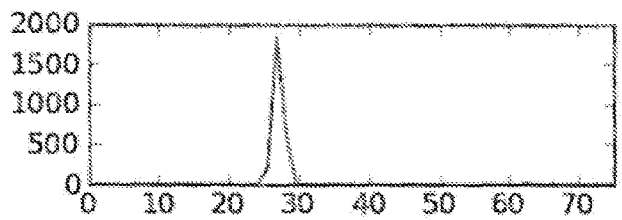
Figure 5C:
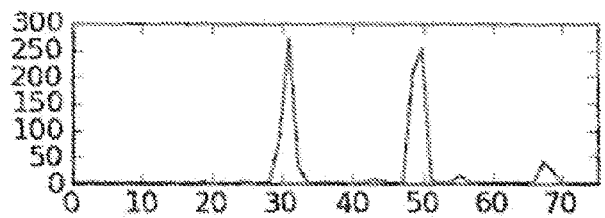
Figure 5D:
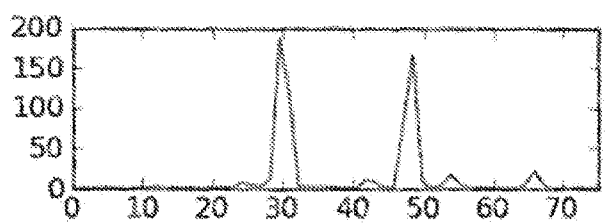

The complexity of the frequency spectrum of the signal is analyzed (Block 204). The frequency spectra of a signal may be obtained by taking a 1024-point Discrete Fourier Transform (DFT) of the signal 130, although other DFT window sizes could be used. It will be appreciated that when a $2^N$-point DFT is being calculated wherein N is an integer, a computationally efficient Fast Fourier Transform (FFT) algorithm could be used for the calculation. FIGS. 5A-5D illustrate frequency spectra of various signals 30. FIGS. 5A and 5B show simple DFTs having a single peak in the frequency spectrum, while FIGS. 5C and 5D show more complicated DFTs including multiple peaks in the frequency spectrum.

The basic concept is that "simple" frequency spectra have single dominant peaks while the "complicated" frequency spectra have multiple dominant peaks. When a spectrum is complicated, the fundamental frequency can be ambiguous, and therefore harder to identify when attempting to track variations in the fundamental frequency.

In general, signals obtained from engines with 5 or fewer cylinders may be considered "simple". However, in some cases, 6-cylinder engines can produce a "simple" signal (i.e., a signal having a "simple" frequency spectrum).

Correlation refers to a mathematical operation that compares one signal with another. In particular, correlation is a measure of how similar two signals (e.g. f[k] and g[k]) are when they are offset from each other by a given shift n. Mathematically, correlation of discrete signals f[k] and g[k] is defined as:

$$(f \otimes g)[n] = \sum_{m=-\infty}^{\infty} f[m]g[n+m] \quad (2)$$

In a correlation operation, the signals are repeatedly shifted and multiplied together. At each shift n, the signals are multiplied together on a sample by sample basis, and the results are summed. Thus, correlation of two signals produces a sequence of numbers that indicate how similar the signals are over a range of shift values. The peak of the correlation sequence indicates the shift value at which the signals are most similar.

FIGS. 6A to 6D illustrate correlation results and alignment of portions of the signals corresponding to FIGS. 5A to 5D, respectively, based on the correlation results. In particular, FIGS. 6A(1) to 6D(1) illustrate RPM variation over a 10-second interval. The graphs of FIGS. 6A(2) and 6B(2) illustrate portions of simple filtered engine signals that were aligned using autocorrelation, while the graphs of FIGS. 6C(2) and 6D(2) illustrate portions of complex filtered engine signals that were aligned using maximum adjacent correlation.

Figure 6A:
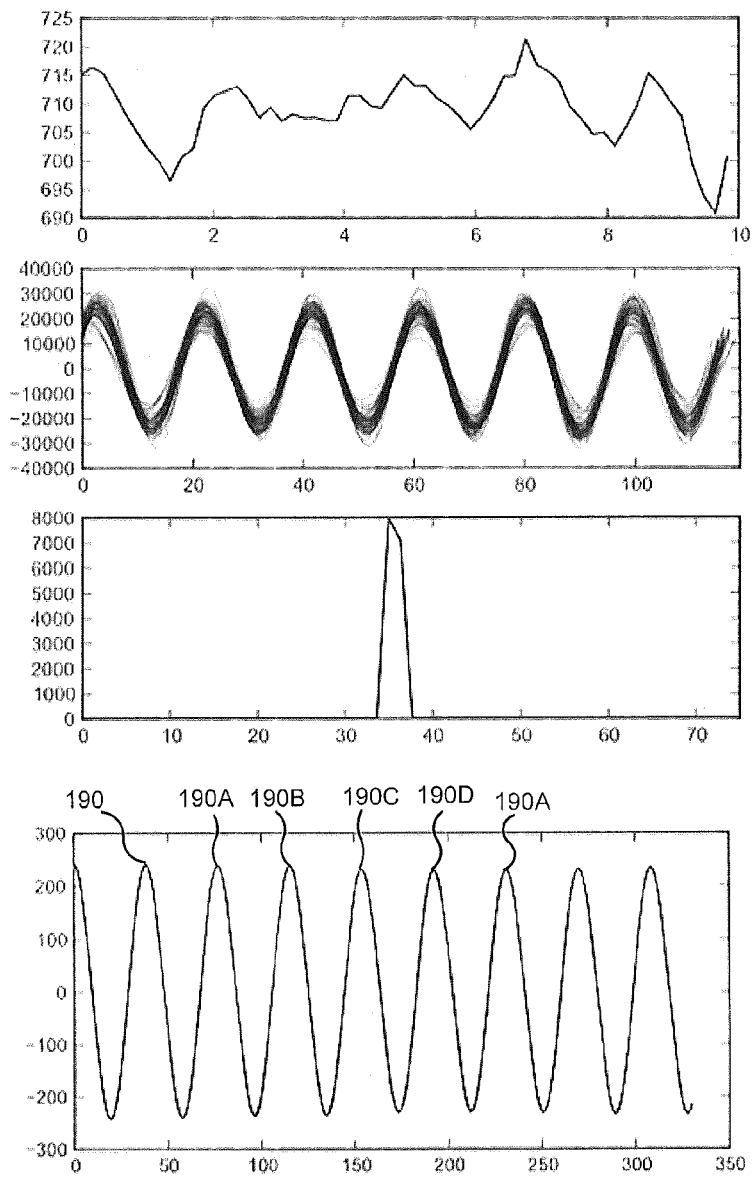
FIGS. 6A to 6D illustrate correlation results and alignment of portions of the signals corresponding to FIGS. 5A to 5D, respectively.
Figure 6B:
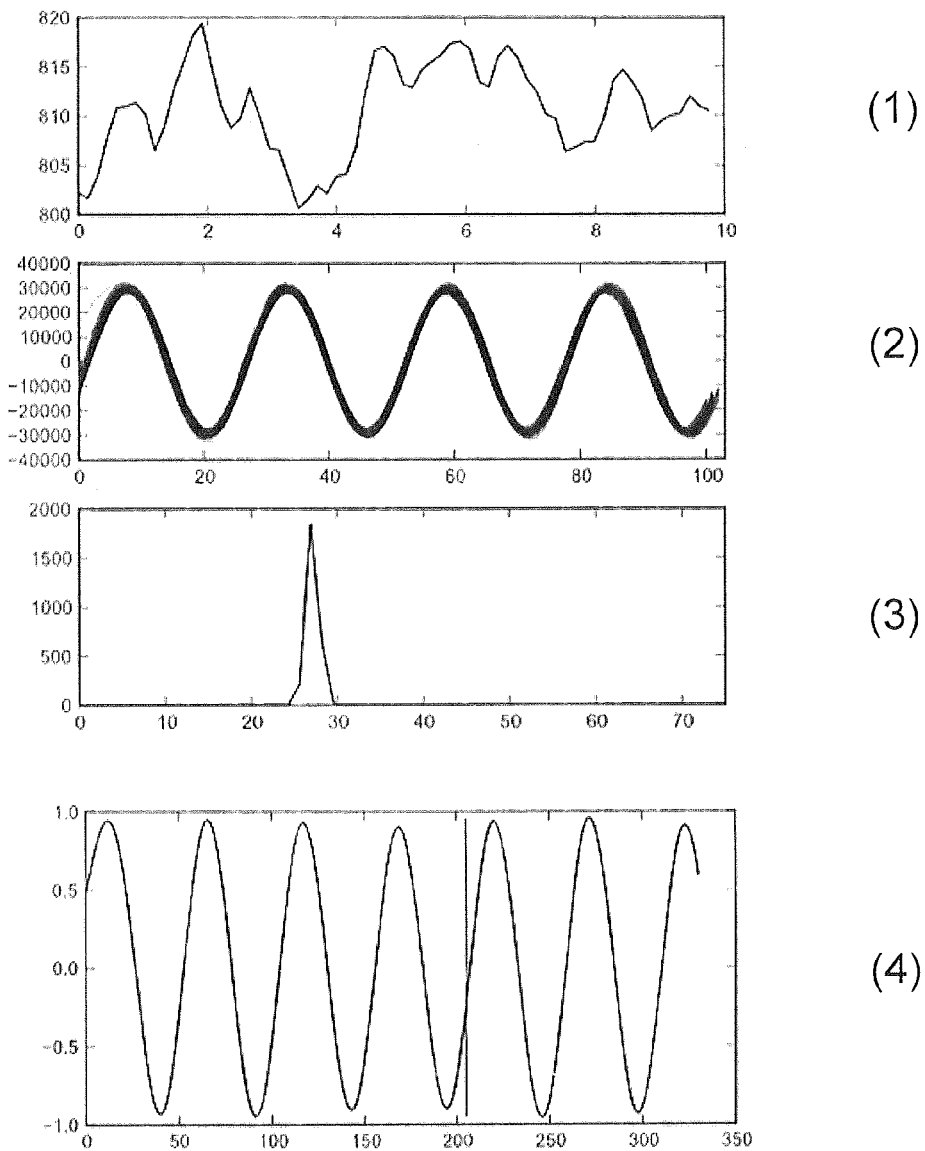
Figure 6C:
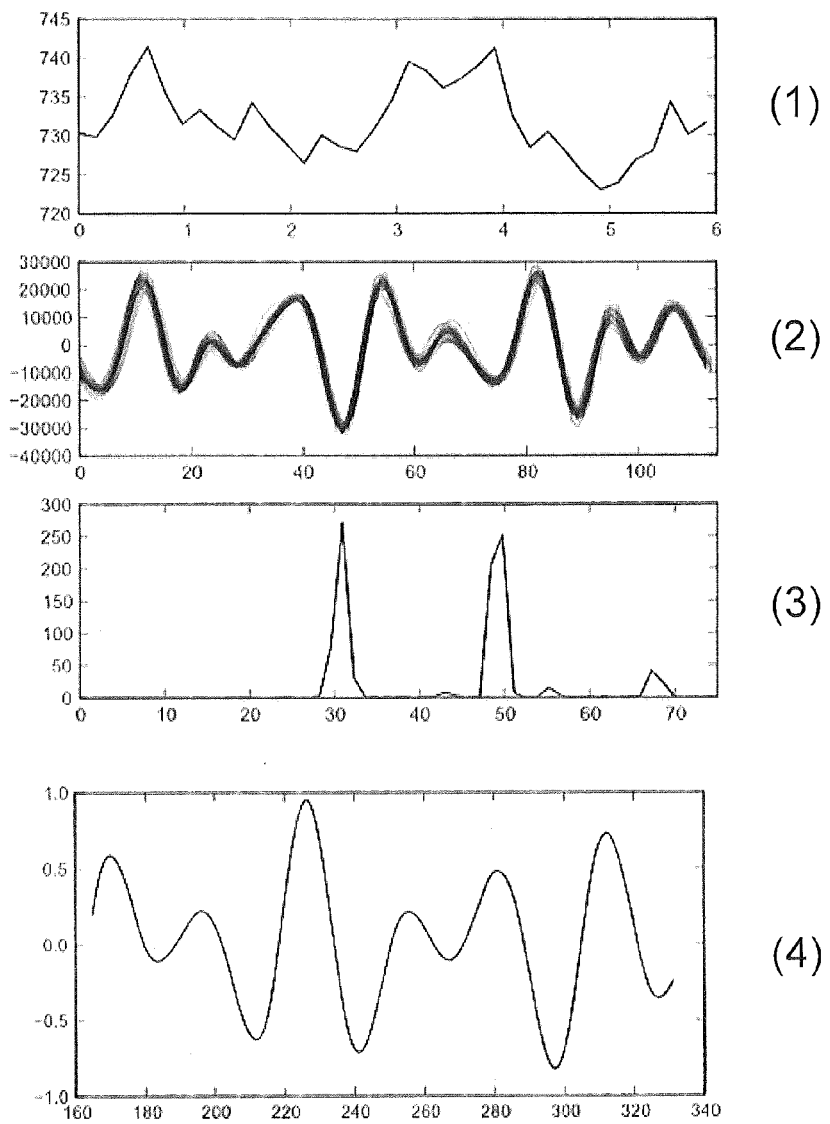
Figure 6D:
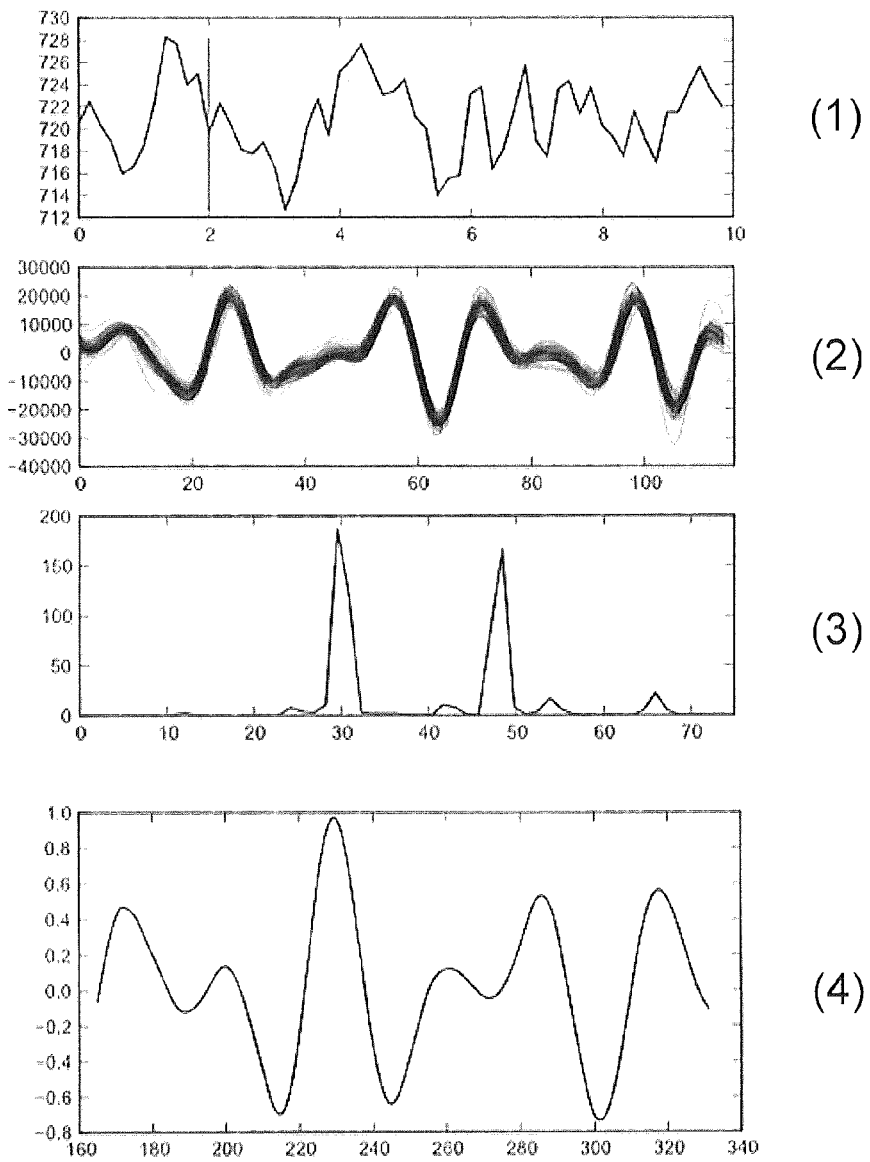

FIGS. 6A(3) to 6D(3) illustrate frequency spectra of the filtered engine signals. FIGS. 6A(4) and 6B(4) illustrate reduced sample rate autocorrelation results, while FIGS. 6C(4) and 6D(4) illustrate results of reduced sample rate maximum adjacent correlation.

As will be appreciated, interpretation of the correlation results for "simple" engine signals may be relatively straightforward, while the correlation results from "complicated" signals may be more difficult to interpret.

In particular, FIG. 6A(4) shows a repeating pattern of correlation peaks 190 spaced at regular intervals.

In particular, correlation results for "simple" signals may have local maxima at time points when the signal shows more similarity to earlier versions of itself. The repetitive nature of the engine's signal produces regular peaks in the correlation results that show where it repeats.

The duration is determined to be a multiple of the distance between the correlation peaks (e.g., the cycle duration is determined based on the number of samples from the first correlation peak 190A to the next correlation peak 190A).

Accordingly, for a "simple" signal, the engine speed at a particular portion of the signal 130 can be measured directly from the correlation results at that particular portion of the signal 130.

Processing of "Simple Signals"

According to some embodiments, the duration of an engine cycle can be determined in one of two ways depending on whether or not the signal 130 has a complicated frequency spectrum. For signals having simple frequency spectra, a correlation is performed and the correlation results are analyzed. A number of peaks in the correlation output corresponding to the number of cylinders of the engine is counted.

In particular, estimation of the engine cycle length, or duration, may be done using an auto-correlation analysis of portions of the signal sample at selected time points. This means that a section of the signal is correlated with a time shifted version of itself (or another section of the signal).

Figure 7A:
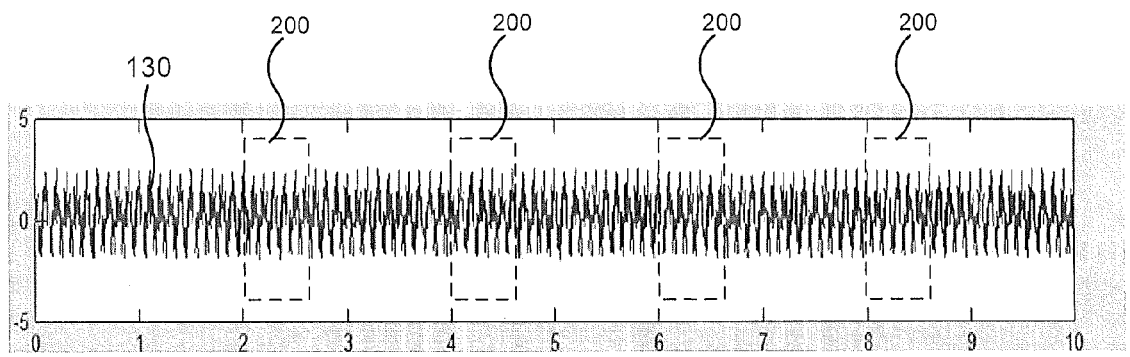
FIGS. 7A and 7B illustrate processing of "simple" signals in accordance with some embodiments.
Figure 7B:
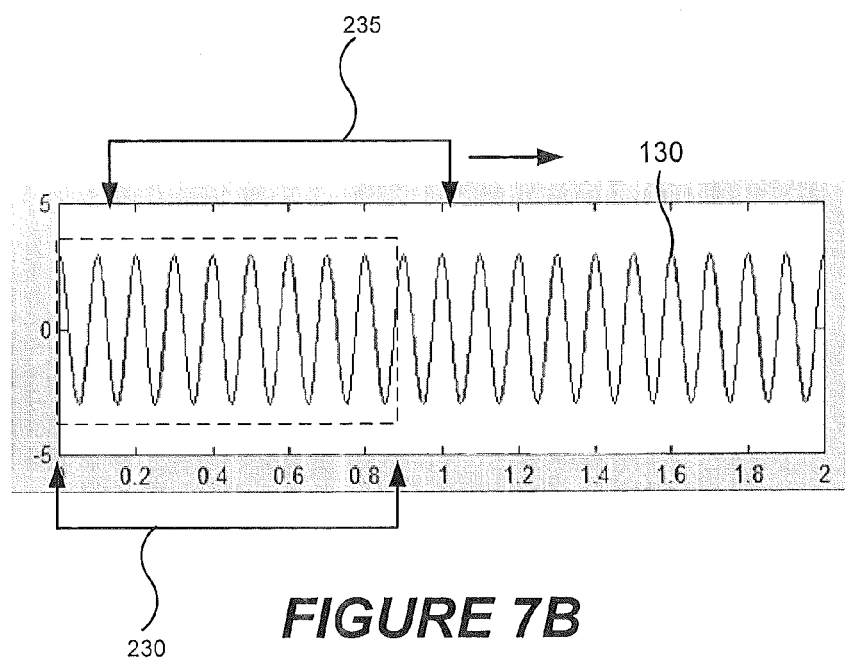

Processing of "simple" signals is illustrated in FIGS. 7A and 7B. The X- and Y-axis scales shown in FIGS. 7A and 7B are arbitrary.

Referring to FIG. 7A, sections 200 of the signal 130 are chosen for correlation analysis at various locations in the signal sample. These sections 200 may be referred to as correlation windows. The length of the sections 200 may be chosen to be large enough to include at least several engine cycle durations. For example, for a four cylinder engine, the correlation window may have a length of 0.6 seconds.

Referring to FIG. 7B, a fixed reference window 230 is established at the start of each section. A sliding correlation window 235 is defined relative to the fixed reference window 230. The portion of the signal 130 in the sliding window 235 is correlated with the portion of the signal in the sliding window, and the correlation results are analyzed. The sliding window is advanced to start at the next sample, and the correlation is again performed until sufficient cylinder peaks are counted in the correlation output. The speed of the engine can then be taken from the correlation output results as described above with respect to FIG. 6A.

In other embodiments, for simple signals, the portion of the signal in the reference window 230 may simply be correlated with itself, and the correlation results analyzed as described above with respect to FIG. 6A(4).

In still other embodiments, the portion of the signal in the reference window 230 may be analyzed to identify repetitive features, such as zero crossings with positive slope, zero crossings with negative slope, etc. The zero crossings may be used to align adjacent cycles, and the last cycle length may be used to predict the next cycle length and then use the zero (or other constant) to fine tune the next one.

Processing of "Complicated" Signals

For engines with complicated frequency spectra, (e.g., engines with 6 or more cylinders), a single DFT, such as a 1024-point Hamming-windowed FFT, is taken from the middle of each ten-second segment (at the reduced sample rate of 1378.125 Hz, equivalent to approximately one second worth of signal).

In the eight cylinder case, the spectrum for a ten-second segment is considered "complicated" if it has at least two peaks above the minimum threshold (for example, 0.0625*maximum FFT magnitude). In the six cylinder case, a spectrum is considered complicated if it has at least four strong peaks (at 0.03125*maximum FFT magnitude), OR if it has at least two strong peaks, but at least one of the peaks is very strong (0.5*maximum FFT magnitude), and outside the min/max RPM range for a six cylinder. In addition, a noise reduction step may be applied between the FFT and the peak detection, which amounts to a frequency domain cyclic autocorrelation (i.e. conjugate multiplication of the spectrum). Note this is completely unrelated to the primary [moving] correlation analysis that is performed in the time domain for signals with simple spectra, although it is used for a similar reason.

For signals having more complicated spectra (as indicated by the presence of multiple peaks in the FFT output), a maximum adjacent correlation method (Block 208) may be used.

Figure 8A:
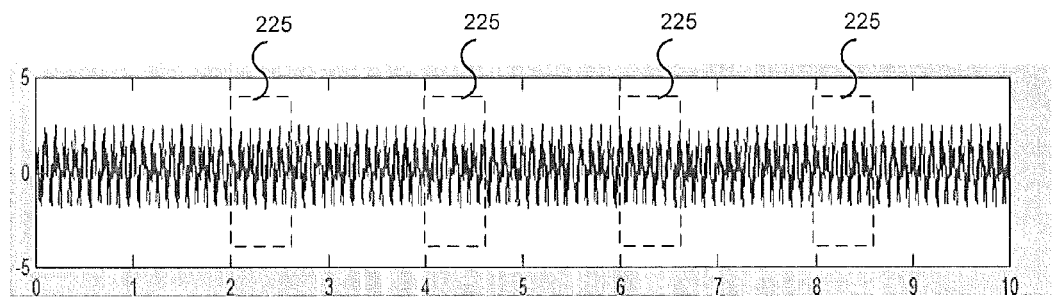
FIGS. 8A to 8C are graphs illustrating maximum adjacent correlation in accordance with some embodiments.
Figure 8B:
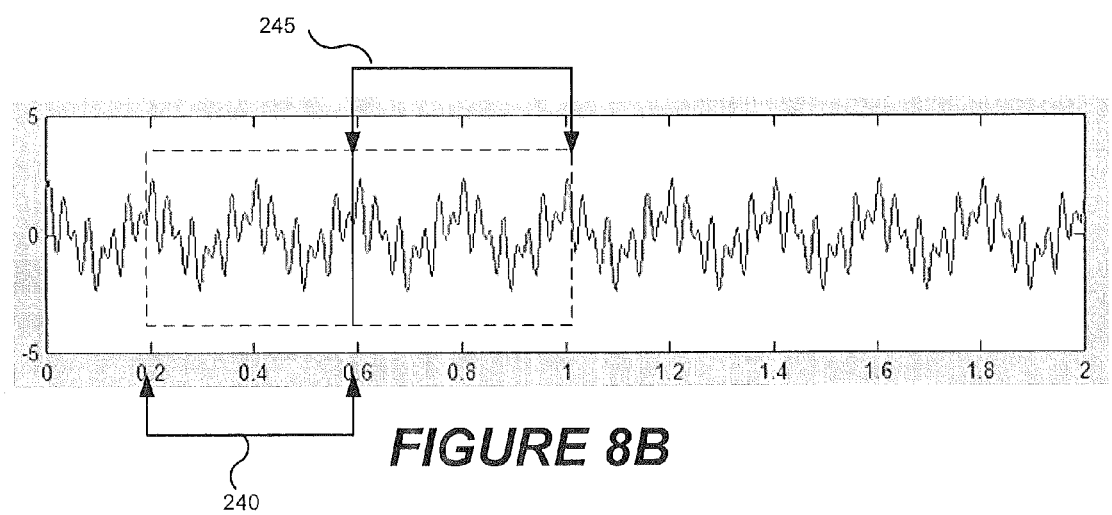
Figure 8C:
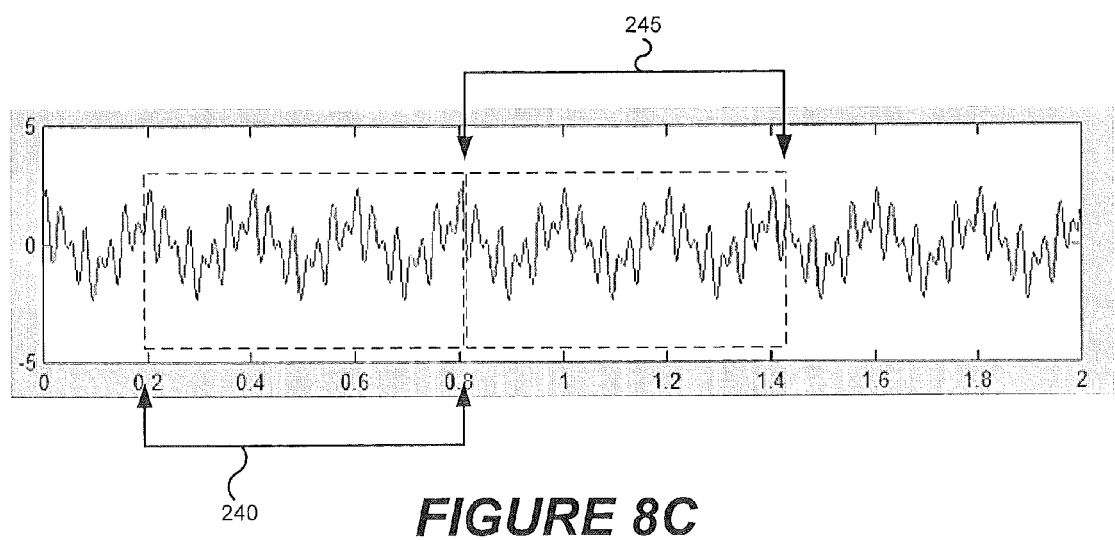

Maximum adjacent correlation is illustrated in FIGS. 8A to 8C. The X- and Y-axis scales shown in FIGS. 8A-8C are arbitrary.

Referring to FIG. 8A, similar to the "simple" case, sections 225 of the signal are chosen for correlation analysis at various locations in the signal sample. A minimum expected duration (corresponding to a maximum RPM) and a maximum expected duration (corresponding to a minimum RPM) are estimated.

Referring to FIG. 8B, at each section 225, a first correlation window 230 is defined. The first correlation window 230 has a length equal to the minimum expected duration. A second correlation window 235 is defined adjacent the first correlation window 230, and has the same length as the first correlation window 230.

The portion of the signal 130 in the first correlation window 240 is correlated with the portion of the signal 130 in the second correlation window 245.

The first and second correlation windows 240, 245 are then increased by one sample each, and the correlation is performed again. This process is repeated until the first and second correlation windows have reached their maximum length, corresponding to the minimum expected RPM, as shown in FIG. 8C.

The duration is assumed to be equal to the length of the correlation windows 240, 245 at which the correlation output is maximized.

To speed processing of this step, the following can be done: a. At a lower sample rate, the algorithm estimates the length of engine cycles using the above technique for time periods spaced (evenly, randomly or otherwise chosen) throughout the signal. b. RPM estimates that would not be likely due to unrealistic accelerations are discarded. In other words, RPMs that change "too fast" are removed. c. The remaining RPMs are curve fit to create an initial guess of how RPM varies over time using a spline, linear or other fit. d. Using the full sample rate and the estimated RPM trace as a starting point, the RPM prediction is optimized over time by looking for the nearest auto-correlation or maximum adjacent correlation maximum corresponding to the guessed RPM and using that maximum to derive the predicted RPM at full sample rate.

Figure 9:
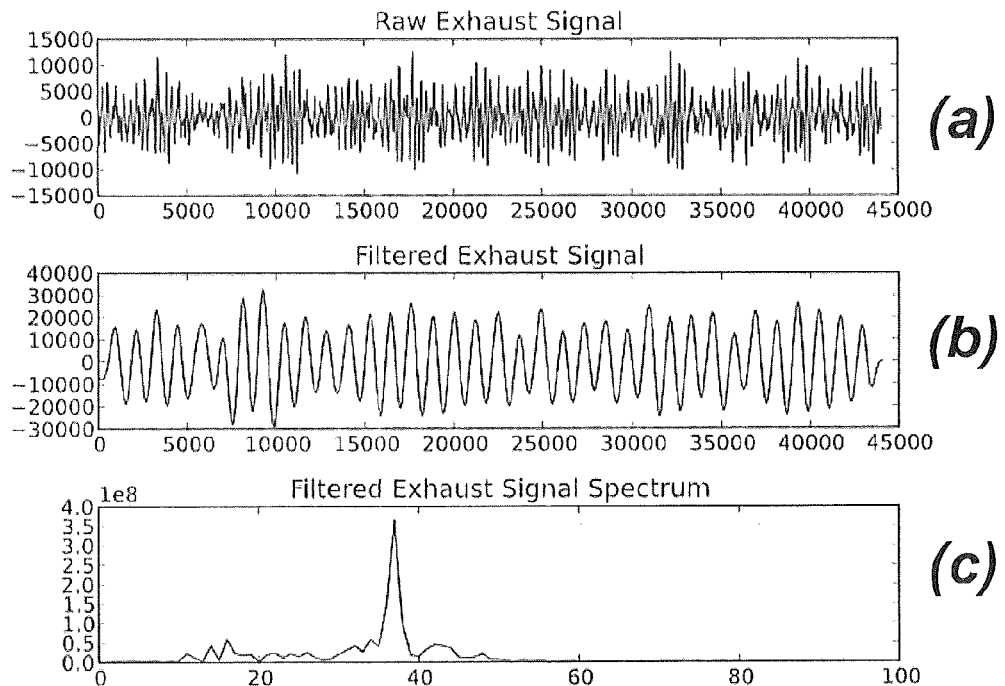
FIGS. 9-10 illustrate analysis of an engine signal from a six cylinder engine having a simple spectrum in accordance with some embodiments.
Figure 10:
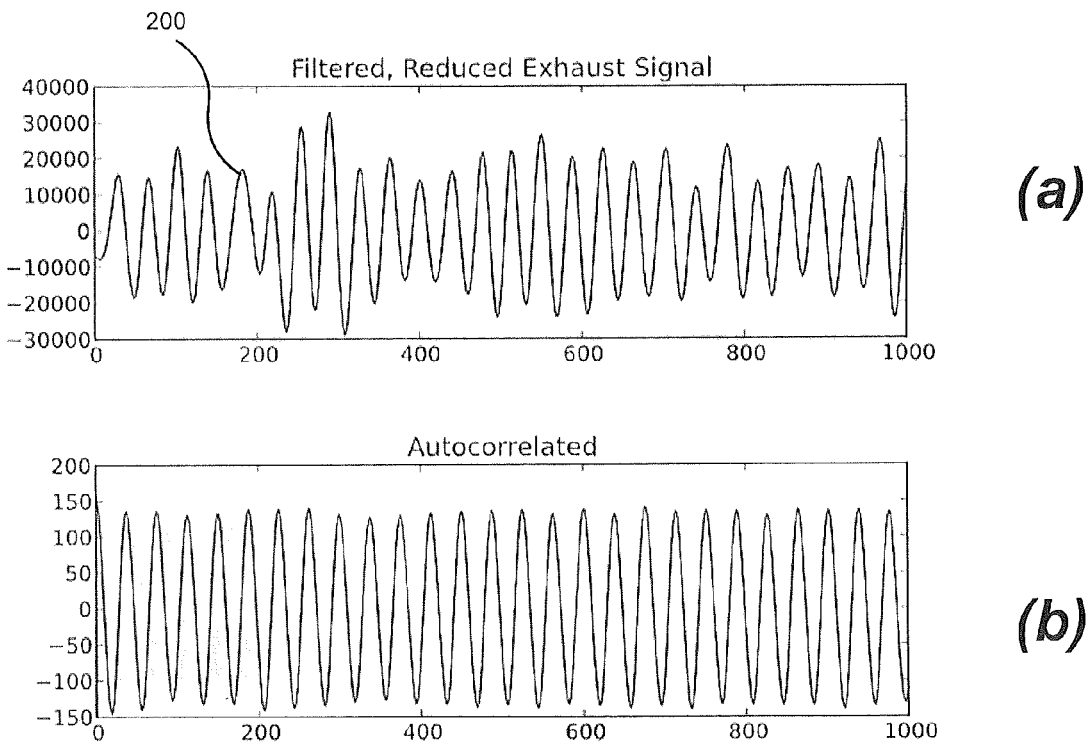
Figure 11:
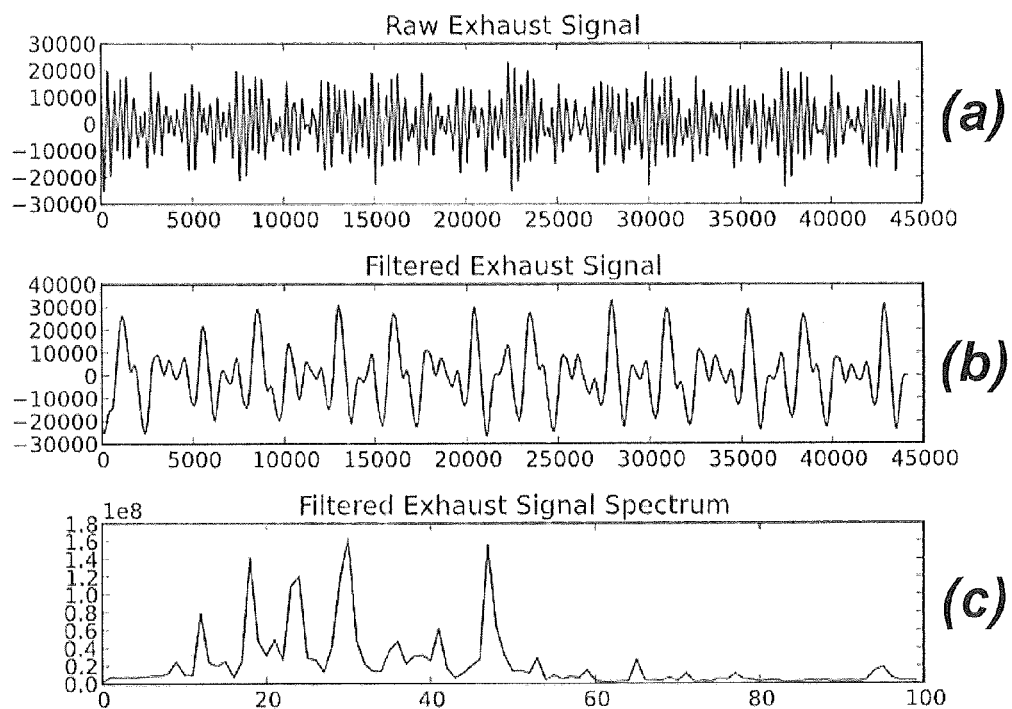
FIGS. 11-12 illustrate analysis of an engine signal from an eight cylinder engine having a complicated spectrum in accordance with some embodiments.
Figure 12:
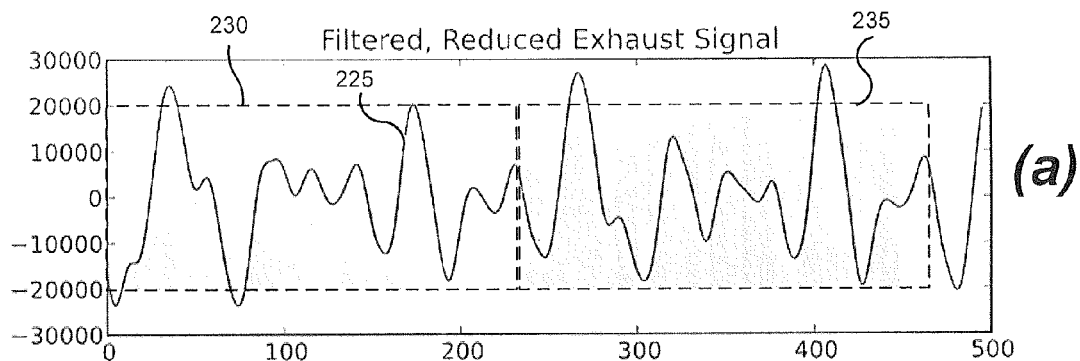
Figure 12:
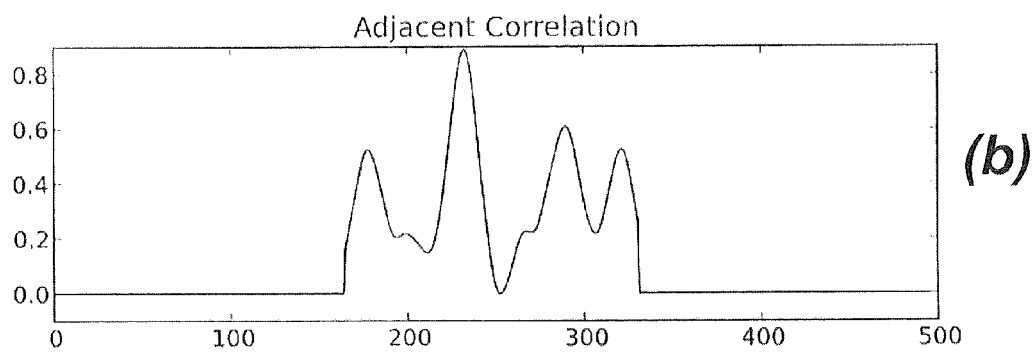
Figure 13A:
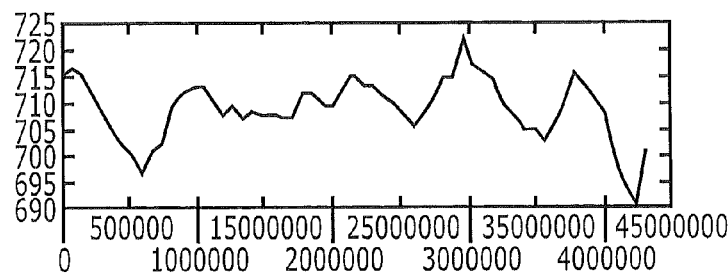
FIGS. 13A to 13D illustrate graphs of engine speed in RPM versus time corresponding to FIGS. 5A-5D, respectively.
Figure 13B:
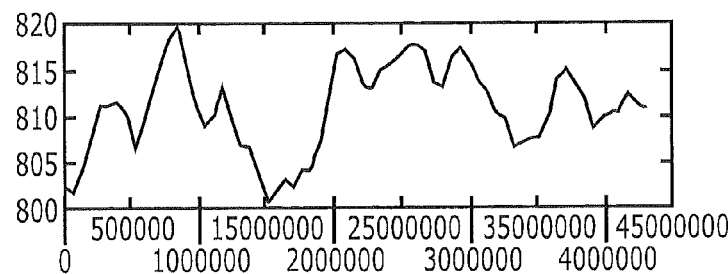
Figure 13C:
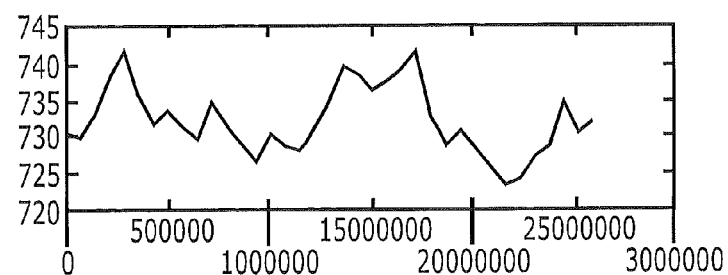
Figure 13D:
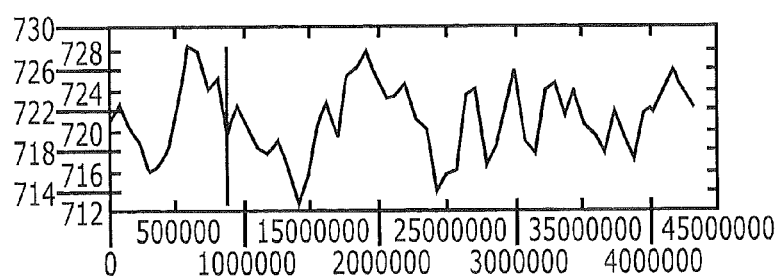

FIGS. 9-10 illustrate analysis of an engine signal from a six cylinder engine having a simple spectrum, while FIGS. 11-12 illustrate analysis of an engine signal from an eight cylinder engine having a complicated spectrum.

In particular, FIG. 9(a) is a graph of a raw acoustic signal measured at the exhaust of a vehicle. FIG. 9(b) illustrates a low pass filtered version of the exhaust signal, while FIG. 9(c) illustrates the relatively simple frequency spectrum of the filtered signal.

FIG. 10(a) illustrates a segment 200 of the filtered signal, while FIG. 10(b) illustrates autocorrelation results obtained by autocorrelating the segment 200 (i.e., correlating it with itself). The autocorrelation results show clear autocorrelation peaks from which the duration of the engine signal can be determined as discussed above.

FIG. 11(a) is a graph of a raw acoustic signal measured at the exhaust of a vehicle having an eight-cylinder engine. FIG. 11(b) illustrates a low pass filtered version of the exhaust signal, while FIG. 11(c) illustrates the relatively complicated frequency spectrum of the filtered signal.

FIG. 12(a) illustrates a segment 225 of the filtered signal including adjacent correlation windows 230, 235, while FIG. 12(b) illustrates correlation results obtained by correlating the portion of the signal in the first correlation window 230 with the portion of the signal in the second correlation window 235.

FIGS. 13A-13D illustrate graphs of engine speed in RPM versus time corresponding to FIGS. 5A-5D, respectively.

Referring again to FIG. 3, once a set of data points corresponding to estimated RPMs at each selected segment of the signal 130 have been obtained, outlying data points in the correlation results may be eliminated (Block 210). In particular, assuming that the engine is idling at near-constant RPM, an iterative outlier analysis is applied to remove duration length estimates that are more than two standard deviations away from the mean of the remaining estimates. The remaining duration lengths are assumed to be representative of the true engine idle RPM.

Next, the duration lengths between the remaining duration length estimates are interpolated (Block 212) to produce an estimated duration length trace for the time-span of the recording. In some embodiments, the algorithm takes the estimated duration length trace and computes and subtracts a drift trace to account for RPM drift caused by engine warming.

The cycle length estimates may then be refined (Block 214). In some embodiments, the algorithm then starts back at the beginning of the recording and attempts to identify each engine duration explicitly by aligning the signal sections from adjacent durations. The starting point for the first duration is chosen to be the lowest point in the first half second of the recording. The starting point of the next duration is determined by: 1. First, looking up the duration length of the previous duration in the estimated duration length trace, 2. Then, shifting the start time of the next duration either earlier or later by the number of samples that maximizes the correlation of the adjacent segments. 3. When determining the length of the third and subsequent durations, the maximal auto-correlation shifted start time for each duration is determined by selecting the shift that maximizes the auto-correlation to any of the previous N durations (e.g., N=5). This step may be important for the robustness of the algorithm, since the presence of a misfire can cause adjacent durations to be very dissimilar.

The alignment process continues until the end of the recording is reached. The final, partial duration is discarded.

A further refinement may be to discard "outlier" engine speed estimates (e.g., estimates that are more than two standard deviations from mean) and then interpolate the remaining engine speed estimates. Such a refinement may enable these systems/methods to make sense of very noisy signals Finally the engine is diagnosed by looking for characteristic patterns in RPM variation over time based on the computed cycle durations. For instance, a misfire may be characterized by a sudden drop in RPM followed by a recovery. The severity of each misfire can be characterized by the size of the RPM drop. The results are scored (Block 216) indicating predicted misfires.

In some cases, the shape of the signal can be analyzed to identify characteristic patterns or misfire activity. For example, any departure from the regular pattern of a non misfiring signal, such as when a regular peak or valley in the signal is greater or smaller than usual, may indicate the occurrence of a misfire.

Some embodiments of the invention can be totally non-invasive to the vehicle. Embodiments of the invention may be implemented in many different ways, as there are many difference sources of signals that can be used.

Moreover, the measurements used in connection with embodiments of the invention may be very easy to perform.

Some individual sub-components of the engine and vehicle ("Other" motors, e.g., fuel injectors, spark plugs, ignition coils, valves, etc) also have a fixed and repeating constant electro mechanical motion that can also be diagnostically analyzed with the techniques of the invention.

Some embodiments may further provide methods of measuring crankshaft angular acceleration without the need for using sensors and processors built directly in to the vehicle itself.

Figure 14:
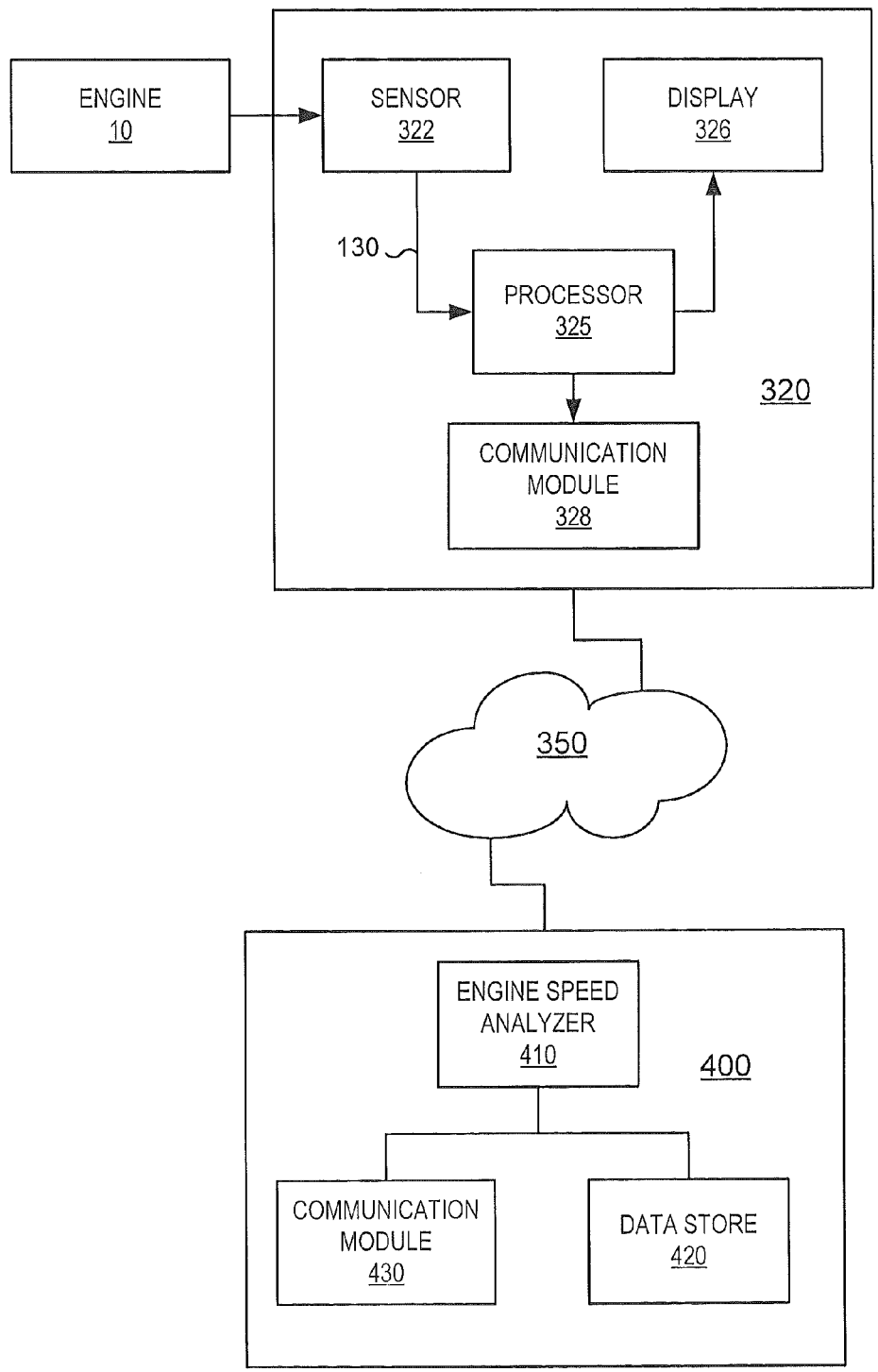
FIG. 14 is a block diagram illustrating systems for remote engine analysis in accordance with some embodiments.

Further embodiments of the invention are illustrated in FIG. 14, which is a block diagram of systems/methods for remote engine analysis. As shown therein, a test unit 320 includes a sensor 322 that senses a signal 130 associated with an engine 10, including an electronic signal or a non-electronic signal, such as an audible signal, a vibration signal, an electromagnetic signal, etc. The sensor 322 can include a transducer that generates an electronic signal in response to an audible signal associated with the engine 10. When the signal 130 includes an analog signal, the processor 325 may sample the signal 130 to convert the signal 130 into a digital signal.

The test unit 320 further includes a processor 325, a display 326 and a communication module 328. The communication module is configured to enable the test unit 320 to communicate with a remote server 400 over a communication interface 350, which can include a public communication network, such as the Internet, a private communication network such as a privately operated Ethernet, a direct point-to-point communication interface, etc. Accordingly, the communication module 328 may be configured to communicate using a data communication protocol, such as TCP/IP, over a wired or wireless communication interface.

The signal 130 is provided by the sensor 322 to the processor 325, which transmits the signal 130 using the communication module 228 over the communication interface 350 to the remote server 400. The test unit 320 may send the signal 130 to the remote server 400 as raw signal data. In some embodiments, the test unit 320 may process the signal data prior to transmitting the data to the remote server. For example, the test unit 320 may truncate the signal to a predetermined number of samples, may filter the data, may compress the data and/or may perform other data processing operations on the signal prior to transmission of the signal to the remote server 400.

The remote server 400 includes an analyzer 410, a communications module 430 and a data store 420. The communications module 430 is configured to enable the remote server 400 to communicate with the test unit 220 over the communication interface 300. In particular, communications module 430 receives the data signal 130 from the test unit 220 and provides the data signal 130 to the analyzer 410 for analysis using the techniques described herein. The communication module 430 also transmits a signal from the analyzer 410 to the test unit 220 indicative of the results of the analysis of the data signal 130.

The data store 420, which may include one or more local or remotely accessed databases, may contain information used by the analyzer 410 to analyze the signal.

The engine speed analyzer 410 analyzes the electronic signal 130. From this analysis, the engine speed analyzer 410 may identify the occurrence of a misfire condition in the engine 10 as described in detail above.

Figure 15:
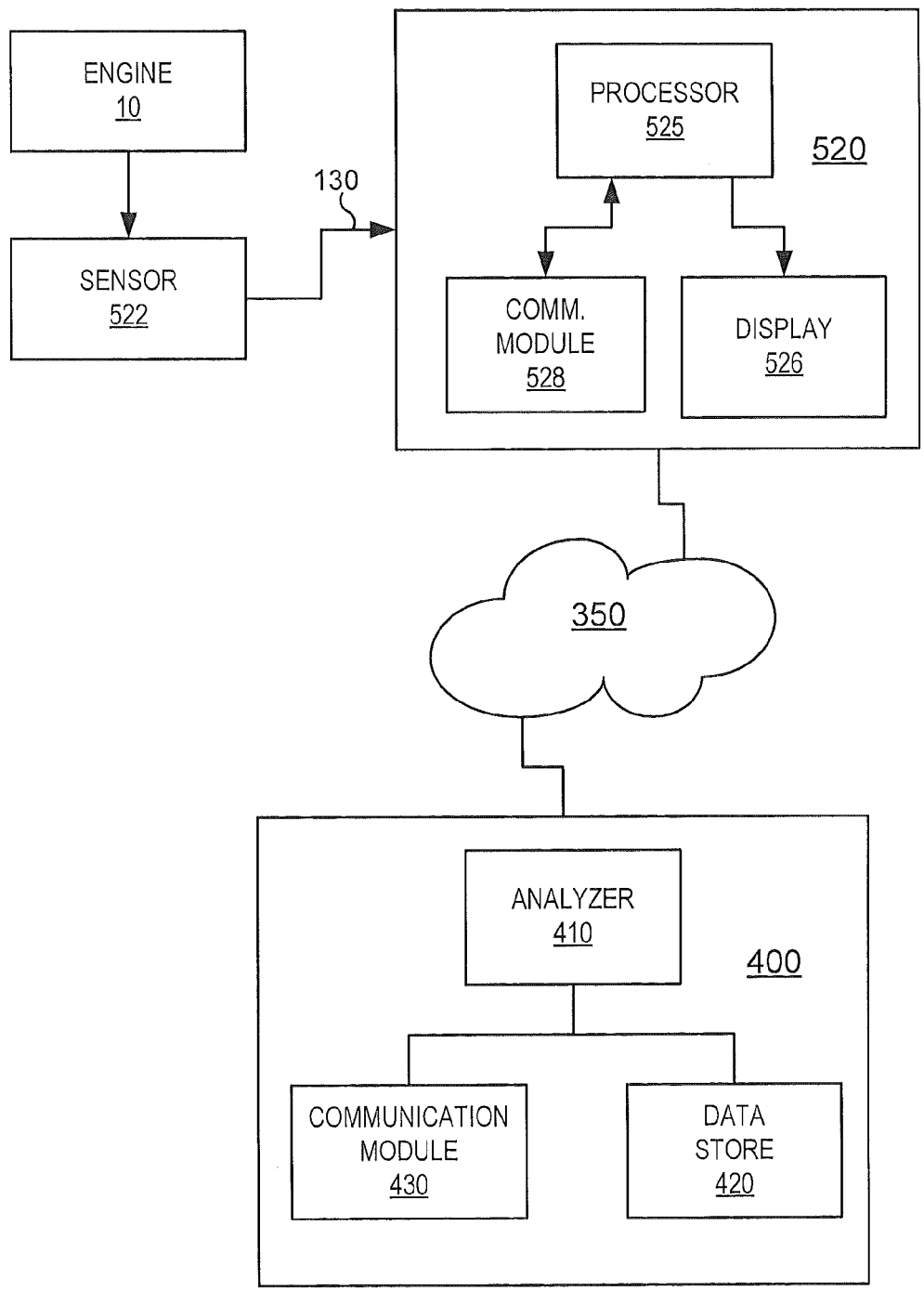
FIG. 15 is a block diagram illustrating systems for remote engine analysis in accordance with further embodiments.

Further embodiments of the invention are illustrated in FIG. 15. As shown therein, a sensor 522 may be provided that is separate from a test unit 520. The sensor 522, which may include for example an acoustic transducer, a voltage detector, a current sensor, etc., may provide a data signal 130 derived from an engine 10 to a test unit 520, which includes a processor 525, a communications module 528 and a display 526. The processor 525, communications module 528 and display 526 are similar in function to the processor 225, communication module 228 and display 226 shown in FIG. 14.

In some embodiments, the test unit 520 may include a handheld computer, a laptop computer, a smartphone, a tablet computer, a desktop computer or any other general purpose computing device that is configured to receive a data signal 130 generated by the sensor 522 and transmit the signal to a remote server 400. When the signal 130 received by the test unit 520 is an analog signal, the test unit 520 may sample the signal to form a digital signal. The digital signal is transmitted by the test unit 520 over a communication interface 300 to a remote server 400 that analyzes the signal as discussed above.

Some embodiments provide systems and/or methods that can accurately measure engine speed variations at short timescales by analyzing electrical signals generated within an automotive system. In particular, these systems/methods may analyze an electrical signal associated with the engine, such as a 12-volt signal generated by the electrical system of an automobile. The 12-volt signal can be sensed, for example, through a standard 12-V outlet in an automobile. Further embodiments may use additional information derived through the ODB II port on an automobile to assess whether or not the engine is misfiring and help determine the cause of the misfire and the cylinder(s) that are experiencing misfires. In some embodiments, a current signal associated with the engine, such as an ignition signal, can be detected and analyzed to identify a misfire condition.

In automobiles in which an engine control computer is present, the engine control computer keeps track of where each cylinder is in relation to the crank angle and turns on ignition and injector coils to charge the coils and fire the spark plugs at the appropriate time. A vehicle engine control computer monitors where each cylinders piston is (via crankshaft position) and controls spark and injection timing. The engine control computer may, but need not, have an ODB II compliant interface.

An ignition coil has both primary and secondary coil windings. Most cars provide a constant 12 volt signal to one of the two inputs on the primary coil, while the ignition system provides a switched ground to the other input on the primary coil that pulses on and off as the engine is turning.

On modern cars, the vehicle's power train control processor determines the ground pulse timing by monitoring crank angle position via a crankshaft position sensor (CKP). With the ignition switched on and the primary ground closed, current flows from the positive battery terminal, through the ignition switch and the primary winding to ground, then back to the negative battery terminal. The on/off ground pulse provides signal for a spark that comes out of the secondary side of the coil.

The CKP can be used in combination with a camshaft position sensor (CMP) by the vehicle processor to monitor the relationship between the pistons and valves in the engine. The rotational speed of the camshaft is half that of the crankshaft. Fuel injection coils are also triggered in the same way as ignition coils with a switched ground to properly time a multi-port fuel injection system. Cylinder specific injection coils are each triggered once every 720 crankshaft degrees, just before each cylinder's intake valve opens. The discharge of injection coils may also appear in the engine electrical signal.

When a spark plug discharges, the entire electrical system of an automobile sees a momentary voltage drop coupled with a spike in RF energy at the moment of discharge.

Figure 16:
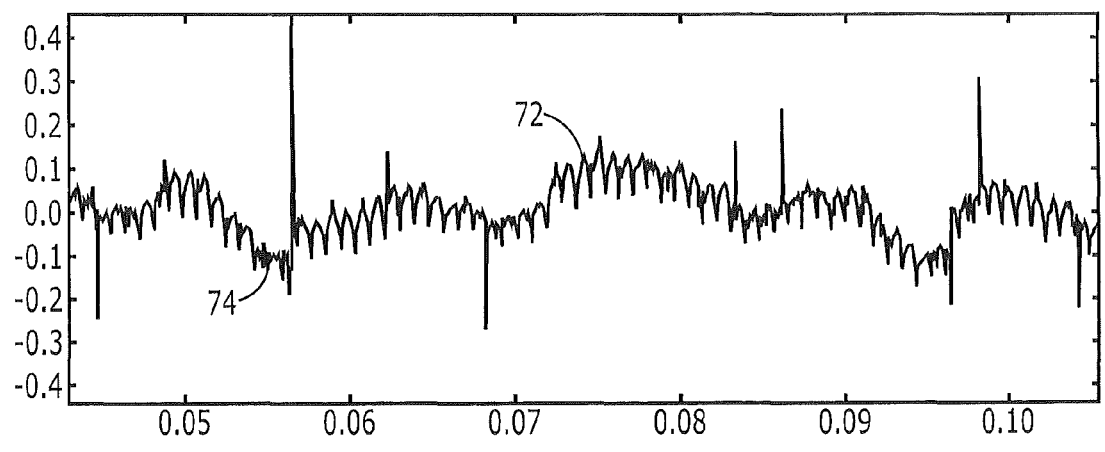
FIG. 16 is a graph of an engine electrical signal showing alternator poles and spark timing.

For example, FIG. 16 is a graph that illustrates a 12V signal of an automobile engine measured while the engine is running. As shown in FIG. 16, the 12V signal includes some low frequency fluctuation or ripple peaks 72 due to the poles in the alternator that generates the signal. A regular series of high frequency pulses 74 is superimposed onto the 12V signal. Some high frequency pulses are generated each time a spark plug in the engine fires.

In general, the timing of the sparks directly indicates the crankshaft position over time. There may be small differences due to retardation of the ignition to control knocking or for traction control. However, this is not typically evident when the engine is idling. Moreover, if the ignition timing is altered by the vehicle's onboard computer, it is normally altered for all cylinders equally.

In general, the vehicle processor will always retard or advance ignition timing for all cylinders equally (as opposed to individually) based on engine load timing requirements. Timing should not change at any given engine speed unless engine load increases, e.g., accelerating after a traffic stop light turns green, or cruising at 3000 rpm and then increasing engine load by pushing the accelerator pedal down further to maintain 3000 RPM while climbing a hill or grade.

Some embodiments measure engine rpm activity by connecting directly to the electrical system, such as to a 12V outlet, or by measuring external RF signals generated by the engine. Some embodiments identify the timing of spark ignition due to either RF spikes or electrical system voltage drops. This information may be used to determine the average speed of the engine based on the spacing of spark ignitions. Other embodiments may identify the engine speed in response to changes in the voltage level of the DC voltage produced by the alternator.

Some further embodiments may use the spacing of the AC peaks 72 in the DC signal due to the alternator poles. Other embodiments use the overall baseline DC voltage as it increases when the engine moves faster to obtain an estimate of engine speed.

Some embodiments may use time domain and/or frequency domain analysis of digital and/or analog signals.

Some embodiments may independently measure a signal, such as an electromagnetic signal, a current signal, an acoustic signal or other signal from an engine component, such as a spark plug, fuel injector, valve, etc., to determine the timing of a specific single cylinder. In general, a signal may be obtained from any mechanical or electronic component of an engine that repeats in synchronicity with the crankshaft revolution, or some multiple or fraction of a crankshaft rotation.

The signal can be used to accurately measure engine RPM over each 720 degree cycle. When this is combined with one of the methods described above along with knowledge of the engine cylinder firing order, it is possible to determine specifically which cylinder firing corresponds to each of the individual rpm accelerations. If a misfire is detected, this will show which cylinder did not fire properly. In fact, it is possible for the engine speed to vary even during individual cylinder firings. It is possible to see the crankshaft speed up with each firing and slow down between firings. From this, it is possible to detect a misfire if the speed up is less than expected or less than some threshold based on previous (or following) engine speed increases.

When the analysis requires knowledge of the number of cylinders and/or the firing order of the cylinders, this information can be derived from the VIN of the car and a database or lookup service, and/or information queried from the OBD II port combined with a database or a lookup service.

This approach can determine random misfires, which can be a sign of the need of an engine cleaning and/or which can be a sign of faulty or incorrect (i) ignition related component, such as spark plugs, ignition coil(s), ignition cables, crankshaft sensor, etc., (ii) fuel/air ratio related components, such as injector(s), injector poppets(s), MAF (mass airflow) sensor, fuel pump, camshaft sensor, etc., or (iii) compression related components, such as weak valve spring(s), sticky valve(s), sticky ring(s), jumped timing chain or belt, etc.

This approach may also enable a repair technician to isolate which cylinder(s) are intermittently misfiring and causing a driveability issue, and/or before a drivability issue becomes evident.

Some embodiments may further be capable of identifying regular repeating misfires, which can be a result of faulty or incorrect (i) ignition related component, such as spark plugs, ignition coil(s), ignition cables, crankshaft sensor, etc., (ii) fuel/air ratio related components, such as injector(s), injector poppets(s), MAF (mass airflow) sensor, fuel pump, camshaft sensor, etc., or (iii) compression related components, such as weak valve spring(s), sticky valve(s), sticky ring(s), defective head gasket, etc.

Some embodiments allow a technician to narrow down what service an engine may or may not benefit from and help decide an effective course of action based on the information.

The vehicle identification number (VIN) can be found by reading from the VIN plate or badge on the car and typed in by hand, scanned as a barcode or optical character recognition (OCR) and/or queried from the OBD II port.

From the VIN, it is possible to determine using a database or lookup service the make, model, engine type (including number of cylinders and firing order), year and other details and options on the car. With this information, it is possible to better diagnose issues or predict recommended service.

In particular, it becomes possible to fine tune recommendations for engine cleaning based on additional information known about the car's details. Moreover, it is possible to look for known rpm variation patterns for a particular vehicle to identify a known potential problem with the engine or other system tied to the engine.

In a V-6 engine, the cylinders are arranged in two rows, or banks of three cylinders each. In modern V-6 engines the cylinders are fired from alternating banks. For example, the firing pattern may described as B1-B2-B1-B2-B1-B2.

According to some embodiments, it is also possible to detect a jumped timing belt or chain on a V6 engine if the spacing between cylinder firings is only equidistant on every other firing (as opposed to equidistant spacing for all cylinders on a correctly mechanically timed V6 engine). Spacing between cylinder firings can be determined, for example, from the spacing between RF spikes associated with the cylinder firings.

Unlike a V6 engine, a modern crossplane V8 engine may not have a completely alternating firing order by bank. For example, some modern crossplane V-8's use the firing order B1-B1-B2-B1-B2-B2-B1-B2. Other modern crossplane V-8 engines using the firing order B1-B2-B1-B2-B2-B1-B2-B1. Most, if not all, modern crossplane V-8's follow one of these patterns and are actually the same firing sequence depending on where the firing sequence is considered to start.

Thus, a jumped timing belt or chain can also be detected on a V8 (or V10) engine if only the even spike spacing follows the same pattern as the firing order (as opposed to equidistant spike spacing for all cylinders on a correctly mechanically timed V8 engine).

Figure 17:
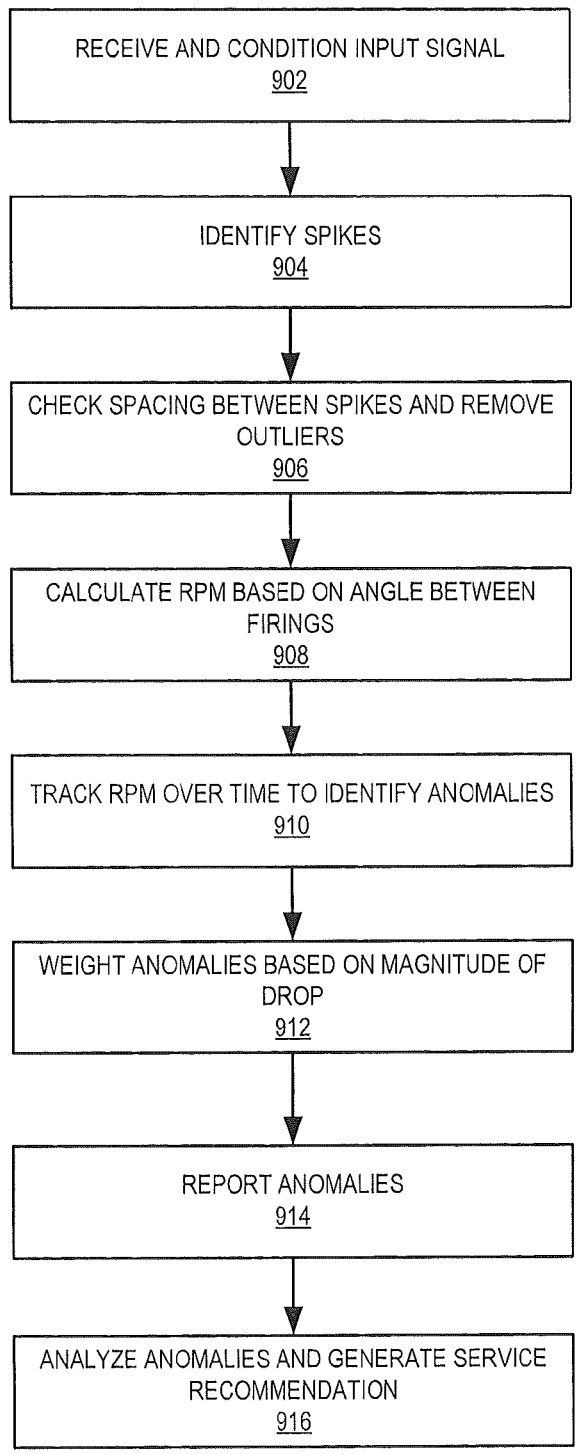
FIG. 17 is a flowchart illustrating engine analysis according to some embodiments.

According to some embodiments, analysis of RF spikes associated with spark plug firing can include the operations illustrated in FIG. 17. As shown therein, first, the input electrical signal is received and conditioned. For example, the electrical input signal that is received from the engine can be filtered with a series capacitor to protect the measurement device and to filter DC components out of the input signal (block 902). The electrical signal can also be filtered with a median filter to reduce impulse noise in the electrical signal and/or filtered with a bandpass filter to precondition the signal for processing.

Figure 17A:
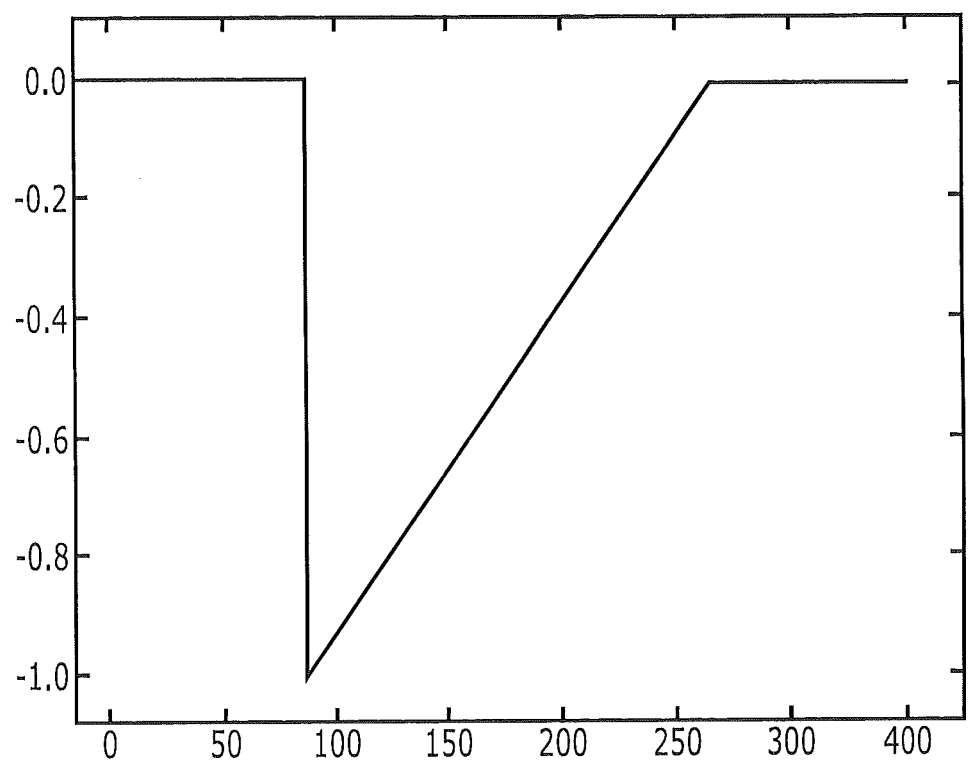
FIG. 17A is a graph of an impulse response of a matched filter that maybe used to identify spark events.

A matched digital filter may be applied to the input signal to isolate short energy spikes for analysis. For most vehicles, each spark event is composed of a sudden drop in DC voltage terminated by a sharp vertical jump. Ignition coil charging events may be detected by looking for asymmetric dips in DC voltage. Once the coil charging event is detected, it is possible to refine the timing of the spark by looking for the exact location of the following vertical jump. An impulse response of a suitable matched filter is shown in FIG. 17A.

Returning to FIG. 17, the systems/methods may identify a plurality of spikes for analysis that are larger than a threshold level, such as energy level, voltage level, shape, etc. (block 904). The systems/methods then check the spacing of the spikes to verify that they are almost regularly spaced (i.e., within the constraints of how quickly engine speed can actually change). Outlying samples can be discarded.

From the remaining spikes, the systems/methods calculate engine speed based on the angle between firings divided by time (block 908). The engine speed can be recorded at some time between (e.g. in the middle of) the last two firings, which corresponds to the average engine speed between those two firings.

The engine speed can be tracked over time. (Block 910). When the engine speed drops by more than an expected amount, an engine speed anomaly may be recorded. The anomaly may be weighted based on the magnitude of the drop in engine speed (block 912). Any detected misfire/anomaly activity may be reported by the systems/methods (block 914), and the systems/methods can recommend a service based on the report (block 916).

Figure 18:
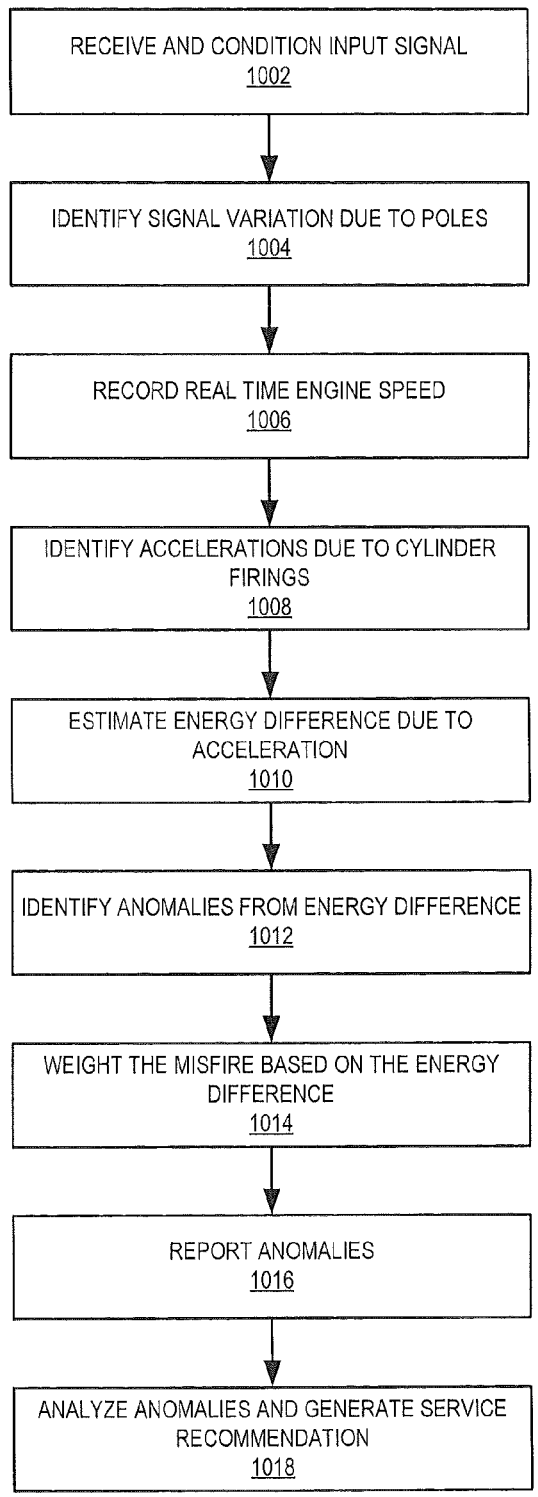
FIGS. 18 to 20 are flowcharts illustrating engine analysis according to some embodiments.

Other systems/methods may analyze peaks in the electrical signal associated with alternator poles to identify potential misfire activity. Analyzing the poles may provide more data points between individual cylinder firings that are obtained by analyzing spark plug signals. For example, referring to FIG. 18, the systems/methods may receive and condition an input signal (block 1002). For example, the electrical input signal that is received from the engine can be filtered with a series capacitor to protect the measurement device and to filter DC components out of the input signal. A band pass digital filter may be applied to the input signal to isolate signal components associated with the alternator poles for analysis.

The systems/methods may then identify signal cycle variation due to poles (block 1004). The systems/methods may use a fast Fourier transform (FFT) with padded input to achieve higher frequency resolution. The systems/methods may then record the real time engine speed based on the spacing of the poles in the time domain (block 1006). The systems/methods may identify accelerations due to cylinder firings (block 1008). In some embodiments, the systems/methods may estimate an energy difference due to the acceleration in the frequency domain ($w^2_f - w^2_i$) (block 1010). If the energy difference is less than a threshold amount, the systems/methods may record the event as an anomaly (block 1012).

The threshold can, for example, include a moving average energy difference, a last energy difference for the cylinder in question, and/or an difference compared to the energy difference associated with the previous cylinder.

The misfire (or anomaly) may be weighted based on the magnitude of the energy drop (block 1014).

The misfire/anomaly activity may be reported (block 1016), and the systems/methods may generate a service recommendation based on the reported misfire/anomaly activity (block 1018).

Figure 19:
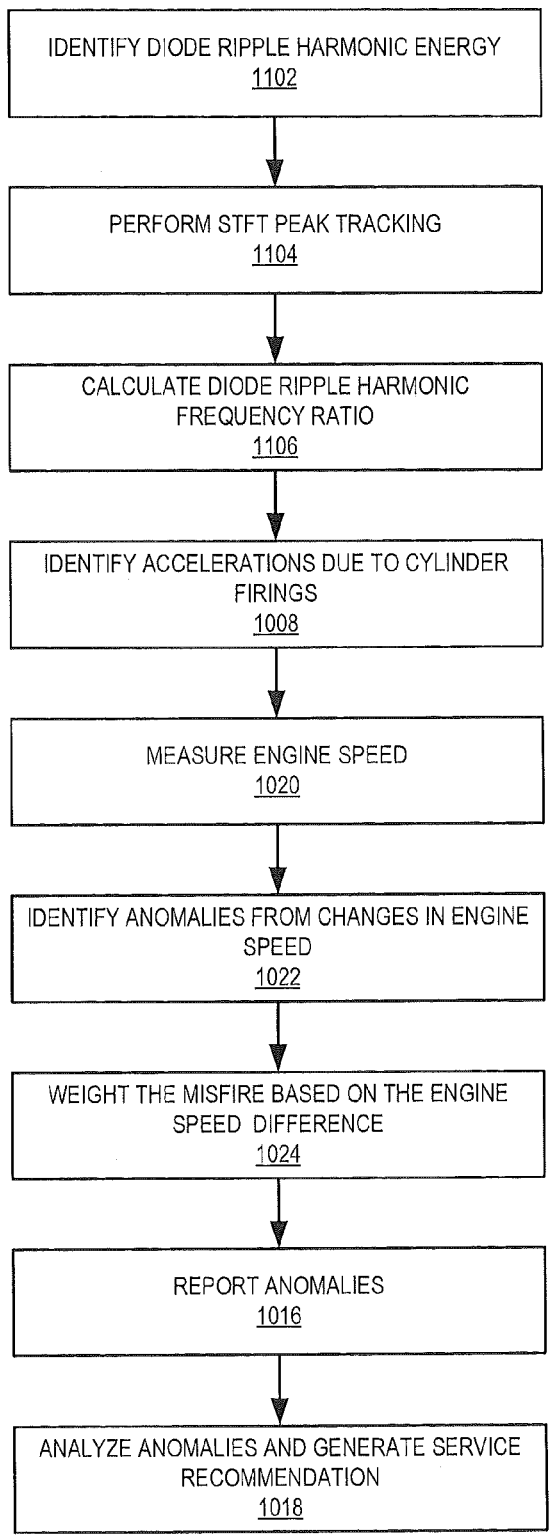

Analysis of the electrical signal may further include the operations illustrated in FIG. 19. These operations may also analyze the AC ripple present in the alternator output (referred to herein as "alternator diode ripple" or simply "diode ripple"). Some further embodiments may identify engine speed variations by tracking one or more harmonics of the spark signal, such as harmonics within a range of about 10 Hz to about 1000 Hz using the techniques described herein. Some further embodiments may identify engine speed variations by tracking increases in DC output from the alternator, typically at a frequency between about 10 Hz and about 40 Hz, using the techniques described herein. Still further embodiments may identify engine speed variations by tracking one or more harmonics in an exhaust signal, typically at a frequency between about 10 Hz and about 200 Hz, but potentially up to 10 kHz. Thus, the AC ripple that is tracked using these techniques may correspond to spark signal harmonics, variations in the DC alternator signal, and/or harmonics in an exhaust signal.

First, the diode ripple harmonic energy (which his usually located between 500 hz and 1500 hz) may be isolated by taking a FFT of the electrical signal and identifying the highest peak within the range of interest (block 1102). In some embodiments, the fundamental frequency range of the ripple may be identified by looking for a strong peak between 700 Hz and 4000 Hz in a short FFT (e.g., less than 20 ms). The signal may be filtered using a bandpass filter with a bandwidth of about 200 Hz at the detected frequency. A median filter may be applied to the resulting signal to reduce noise, and amplitude variations may be removed from the filtered signal by creating a piecewise spline envelope, such as a linear envelope, between peaks and normalizing the signal with respect to the envelope.

Figure 26A:
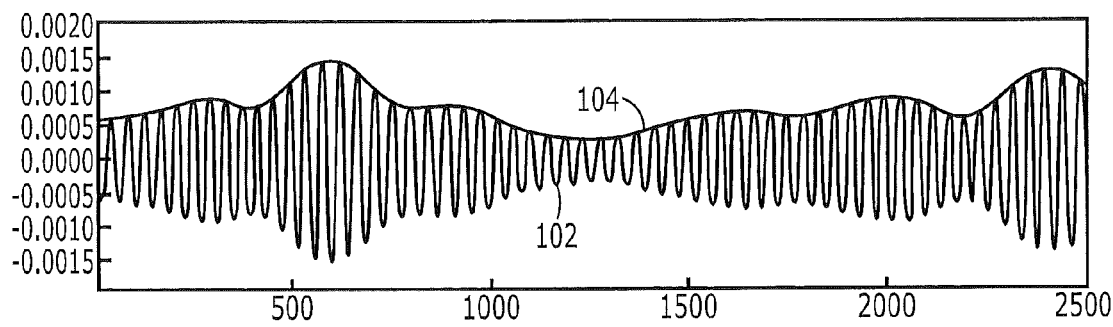
FIGS. 26A and 26B are graphs illustrating normalization of an electrical signal according to some embodiments.
Figure 26B:
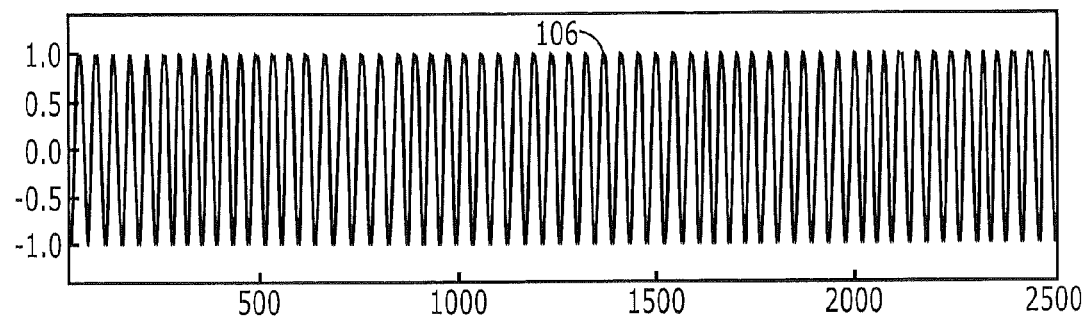

An example of such an envelope is shown in FIG. 26. In particular, the top portion of FIG. 26 shows the signal (curve 102) after the bandpass filter has been applied, along with the extracted amplitude envelope (curve 104). The bottom plot (curve 106) shows the signal after resampling the envelope to the same rate as the bandpass signal, then dividing each sample of the signal by the corresponding value of the envelope (i.e. normalizing).

Referring again to FIG. 19, the systems/methods may perform peak tracking using short time Fourier transform (STFT) analysis centered on the detected frequency.

To perform the STFT analysis, a hamming-windowed analysis frame that is about 0.02 times the sample rate may be used. The sample may be zero-padded about 0.35 times the sample rate (e.g., 1024+16384 samples for a sample rate of 47619). A hop-size of roughly 0.002 times the sample rate may be used (100 samples for 47619). The use of zero-padding results in high-quality interpolation. Sample noise may be reduced by autocorrelating the STFT frames once in the frequency domain through multiplication with the complex conjugate.

For the first frame, the maximum frequency-domain peak may be used. For other frames, the peak that is closest (in frequency) to the previous peak may be used.

Quadratic interpolation may be performed around the maximum peak to refine the frequency estimate. Quadratic interpolation is described, for example, in https://ccrma.stanford.edu/~jos/sasp/Quadratic_Interpolation_Spectral_Peaks.html.

The resulting frequency trace may be smoothed using local least squares polynomial fits, such as in Savitsky-Golay filtering.

In some embodiments, Teager-Kaiser energy operator (TKEO) analysis may be used instead of STFT analysis for peak tracking.

Next, the diode ripple harmonic frequency ratio may be calculated to estimate the engine speed (block 1106). In particular, over an analysis window of less than a second, peak distances in the STFT frequency trace are tracked to obtain a coarse engine speed trace. The average coarse RPM trace value is divided by the average STFT frequency value within the same analysis window to determine the frequency ratio estimate.

The STFT frequency trace is multiplied by the frequency ratio estimate to produce a high-resolution RPM trace.

Figure 21:
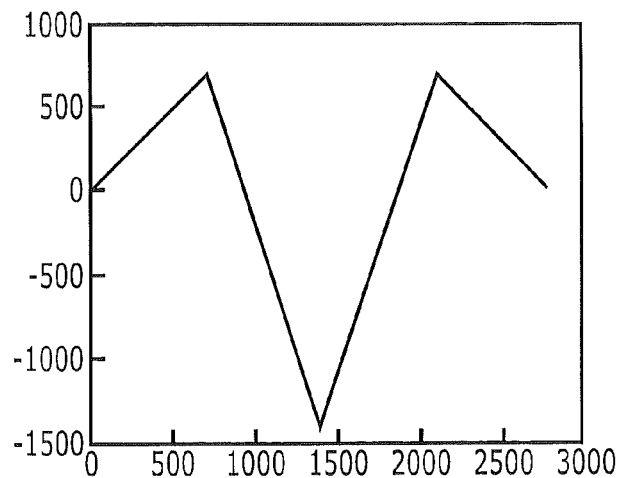
FIG. 21 illustrates a convolved step function that may be used to filter an engine signal in accordance with some embodiments.
Figure 22:
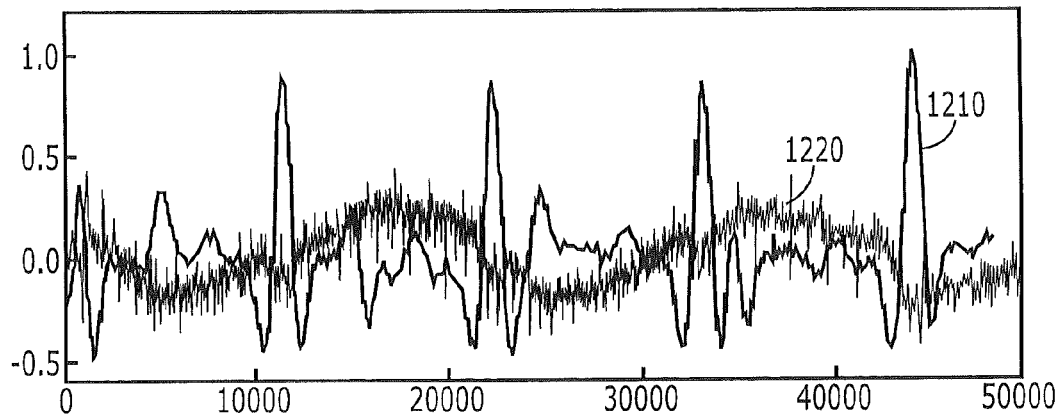
FIG. 22 illustrates a spark indicator signal.

Further embodiments may determine engine speed based on spark coil charging events. For example, referring to FIG. 20, the input electrical signal may be filtered using a step function convolved with itself (block 1202). More complex shapes, such as the ringing after an RF spike, could also be analyzed. A convolved step function is illustrated in FIG. 21. Such a filter may isolate short (e.g., about 4 ms) increases in intensity, which produce a spark indicator signal as shown in FIG. 22. In FIG. 22, a spark indicator signal is shown as curve 1210, while curve 1220 is the raw electrical signal obtained at the terminals of an automotive battery.

The spark signal 1210 trace may be used to determine engine speed. In particular, the locations of peaks may be extracted from the spark indicator trace (block 1204), and a median filter may be used to eliminate transients (block 1206). An engine speed trace may then be formed based on distances between peak locations (block 1208). In some embodiments, when the engine speed drops by more than a threshold amount, an engine speed anomaly may be recorded. (block 1210). In particular, the engine speed trace may be segmented with respect to the valleys in the trace. The height of the peak following each valley is extracted, the peak heights are compared to the median peak height. Peak heights that are less than a predetermined percentage of the median peak height may be taken as indicative of a misfire.

The anomaly may be weighted based on the magnitude of the drop in engine speed (block 1212). Any detected misfire/ anomaly activity may be reported by the systems/methods (block 1214), and the systems/methods can recommend a service based on the report (block 1216).

Figure 20:
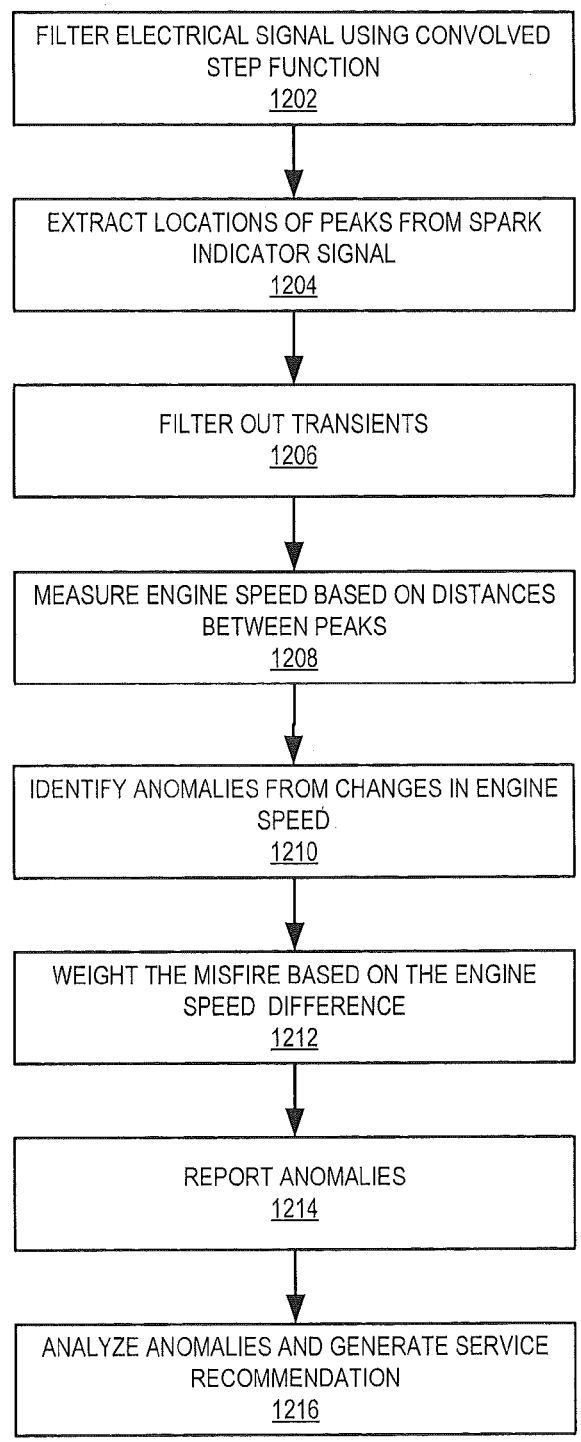
Figure 23:
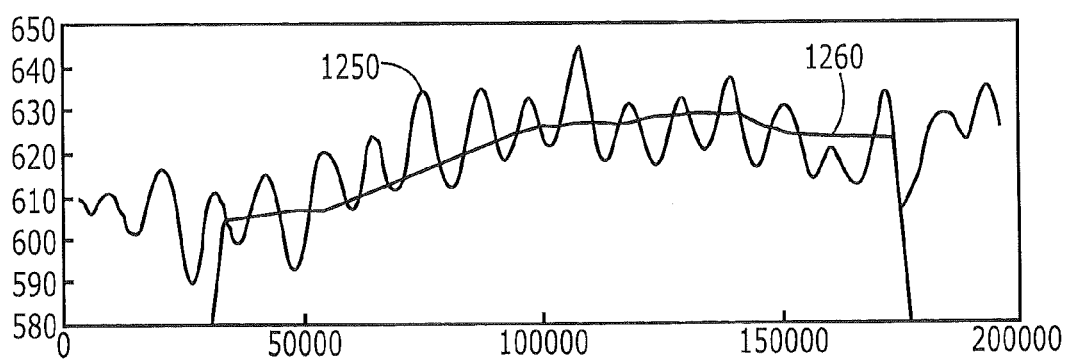
FIG. 23 illustrates a comparison of the diode ripple method and the spark timing method.

FIG. 23 illustrates a comparison of the diode ripple method of FIG. 19 and the spark timing method of FIG. 20. In particular, curve 1250 is a graph of the engine speed determined in response to diode ripple, while curve 1260 is a graph of the engine speed determined in response to spark timing.

Some further embodiments may diagnose engine anomalies, including sensing of incomplete ignition in response to a spark event.

As discussed above, three factors must be present in a properly-functioning internal combustion Otto-cycle engine. Namely, there must be (1) a fuel/air mixture in the combustion chamber with the correct proportions and quantity (2), compression of the fuel/air mixture, and (3) a spark. Systems/ methods described herein may identify misfires that can be caused by the failure of any of these factors. Typically, clogged fuel injectors and/or carbon build-up on the intake valves are more frequently the cause of misfires than low compression or a faulty spark system. Thus, in many cases, a thorough cleaning of the fuel system can resolve a misfire problem.

It may be difficult, however, to identify misfires based on a faulty spark system, as such misfires may occur regularly, rather than intermittently, in the 720-degree Otto-cycle period.

Therefore, some embodiments may examine the condition of the spark system to determine if the spark system is in proper working condition. Such information may allow a service technician to better diagnose a misfire condition. Accordingly, some embodiments provide methodologies for detecting irregularities in a spark system.

In some embodiments, a 12VDC signal in an automobile may be analyzed, and changes in voltage and current flow during a spark event may be examined. Spark events can be identified, for example, using the methods described above.

A normal spark will have a completed circuit to ground. A faulty spark system that has more than one cylinder involved will be noticeably running rough. The signatures of a number of spark system signals present in the 12VDC signal may be averaged to form an expected spark system signal. Any single spark pattern that deviates from the normal pattern by a predetermined threshold amount may be deemed to represent an anomaly.

Some embodiments calculating a Fast Fourier transform (FFT) of the 12V signal and analyze the FFT for changes in successive spark events. Note that this methodology will detect a constant cyclic failure as well as an intermittent failure.

Figure 24:
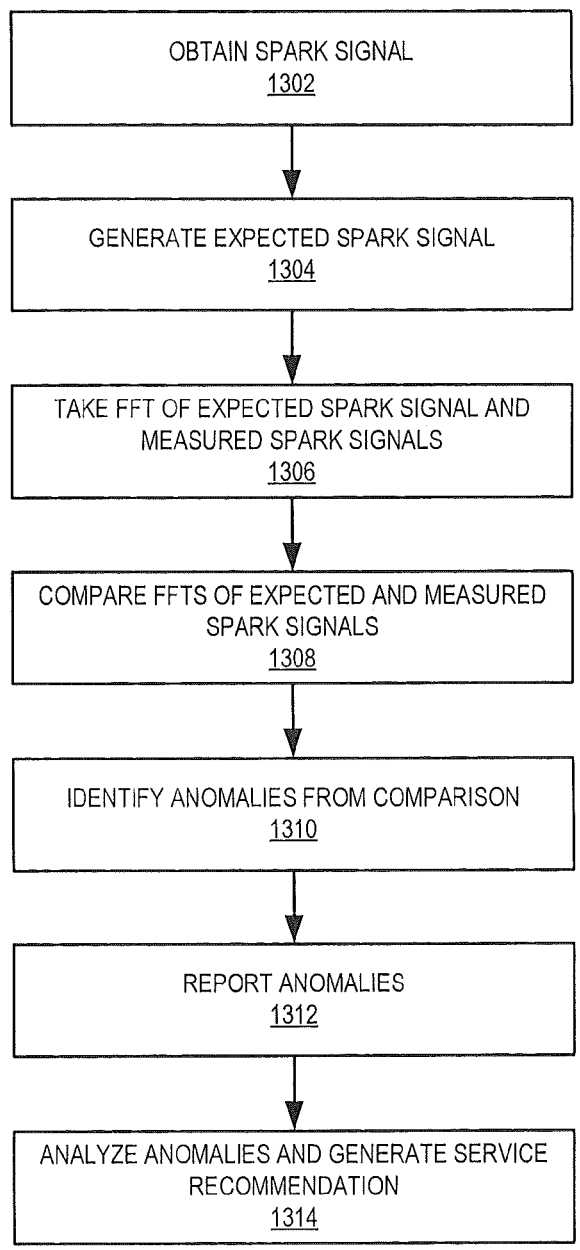
FIGS. 24 and 25 are flowcharts illustrating engine analysis according to some further embodiments.

FIG. 24 illustrates operations that may be performed in accordance with some embodiments. As shown therein, a spark signal may be obtained using, for example, the methods discussed above (block 1302). A number of spark signals may be averaged to obtain an expected spark signal (block 1304). A FFT may be taken of the expected spark signal and of a plurality of measured spark signals (block 1306). The FFT of the measured spark signals may then be compared to the FFT of the expected spark signal to determine if there are any significant differences between them (block 1308). For example, a spark that is generated by a faulty spark system may have frequency components that are not present in the spectrum of the expected spark signal and/or may not include frequency components that are present in the spectrum of the expected signal. Such a missing or extra frequency component may be indicative of a particular type or class of problem in the spark system of the automobile.

In some embodiments, the measured spark signals and/or the spectra of the measured spark signals may be compared with spark signals and/or spectra obtained a library of spark signals collected from non-misfiring engines and/or from misfiring engines to determine if the spark signal represents misfire activity.

Any anomalies between the measured and expected spark signals may be identified (block 1312) and reported (block 1314). Finally, the anomalies may be analyzed, and a service recommendation generated in response (block 1316).

Figure 25:
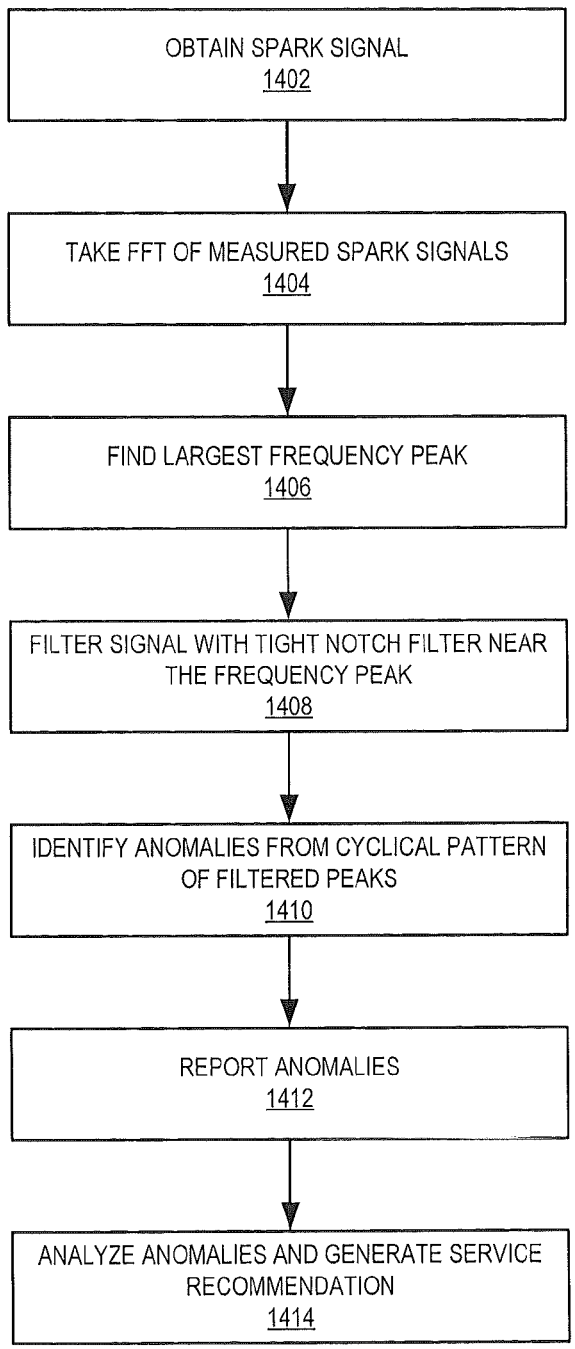

Still further embodiments are illustrated in FIG. 25. As shown therein, an electrical signal may be obtained using, for example, the methods discussed above (block 1402). A FFT may be taken of the signal (block 1406). The largest frequency peak in the FFT is identified (block 1406), and the signal is filtered with a tight bandpass filter near the frequency peak (block 1408). The result of the bandpass filtering gives a waveform where each peak tends to correspond to a single cylinder firing, or at least has a regular cyclical pattern. The spacing of these peaks may provide a good relative engine speed trace, and variations in the engine speed trace may correspond to misfire events.

In some embodiments, the methods may identify a largest peak near an expected (normal) engine idle speed. In still further embodiments, the peaks may be weighted based on proximity to an expected engine idle speed before the largest peak is identified at block 1406.

Any anomalies between the measured and expected spark signals may be identified (block 1412) and reported (block 1414). Finally, the anomalies may be analyzed, and a service recommendation generated in response (block 1416).

Other embodiments involve the injection of a radio frequency (RF) pulse train into the 12V signal and tracking the change of reflections as measured during the periods when the RF signal pulse is not being transmitted. The RF signal pulse may in some embodiments have a single frequency or multiple frequencies. In some embodiments, the RF signal may have a time dependent frequency, such as a chirp signal.

These embodiments may be similar to passive radar systems. Measuring the changes of the reflections of an injected RF pulse is well known in the telecommunications industry and is commonly used to dynamically adjust and "condition" a telecommunications pathway to obtain maximum usable bandwidth. Some embodiments of the present invention use a similar approach to detect and identify anomalies in an electromechanical system, namely, an engine.

The frequency and duration of the pulses may be selected depending on the particular system within the engine that is being interrogated by the signal. The amplitude of the RF pulses may be adjusted to achieve a desired signal to noise ratio, but should be sufficiently small as not to harm or interfere with the normal operation of the engine.

As in the previous technique, the reflection pattern of the normalized N−1 spark events, where N=number of cylinders, may be used to detect an outlier spark signal. This information may be displayed to the service technician.

Still further embodiments include analyzing passive RF signals output by an engine electrical signal. That is, RF energy output by an engine electrical system without inputting an RF pulse to the system may contain information relating to engine speed. The frequency of the RF energy output by the engine electrical system may be related to the engine speed. Accordingly, some embodiments analyze changes in the frequency of the RF energy output by the engine electrical system to identify changes in engine speed that may be caused by misfire conditions. The above-described analytical techniques (e.g., analysis of spikes, ripple, etc.) can also be applied to an RF signal.

Various embodiments of the inventive concepts are presented herein. According to the inventive concepts, there are three main aspects of an engine electrical signal that can be used to track RPM variations, namely, diode ripple corresponding to the poles of the alternator (which tracks alternator RPM), spark plug coil charging/discharging transients (which tracks engine RPM), and/or periodic increases in voltage output when the alternator speed increases (which indirectly tracks engine RPM).

Some embodiments disclosed herein for tracking diode ripple can be used for any of these three aspects of the signal. However, the spark plug coil charging/discharging transients and periodic and increases in voltage output when the alternator speed increases are present in a different part of the spectrum (e.g., around 30 Hz, as opposed to around 1000 Hz for the diode ripple). In addition to tracking spark plug events (e.g., by correlating with an approximate matched filter in the time domain), it is also possible to use the diode ripple algorithm to track harmonics of the spark plug (between about 30 Hz and 500 Hz or so). Some embodiments described herein that employ linear envelopes, STFT and/or TKEO, followed by smoothing, can be used to analyze any of the three physical aspects of the signal. In addition, harmonics of the spark signal can be tracked. This method would apply in more cases than the time-domain correlation method, which is a way of tracking a certain pattern of harmonics all at once.

As will be appreciated by one of skill in the art, the present invention may be embodied as a method, data processing system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java® or C++, However, the computer program code for carrying out operations of the present invention may also be written in conventional procedural programming languages, such as the "C" programming language, functional programming languages, or other programming languages. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method of analyzing an engine for misfire activity, comprising:
   receiving an electrical signal corresponding to a plurality of cycles of the engine;
   identifying energy spikes in the electrical signal corresponding to cylinder firings in the engine;
   generating engine speed estimates based on spacing between the energy spikes; and
   analyzing anomalies in the engine speed estimates to identify misfire activity in the engine;
   wherein the energy spikes correspond to spark plug firings in the engine.

2. The method of claim 1, wherein identifying the energy spikes comprises:
   filtering the electrical signal with a matched filter to isolate the energy spikes; and
   discarding outlying spikes.

3. The method of claim 1, wherein generating the engine speed estimates is performed in response to a crank angle and a time spacing between the energy spikes.

4. The method of claim 1, wherein the anomalies comprise changes in engine speed, the method further comprising weighting the anomalies based on a magnitude of the change in engine speed.

5. The method of claim 1, wherein the electrical signal comprises a 12 Volt signal associated with the engine.

6. A method of analyzing an engine for misfire activity, comprising:
   receiving an electrical signal corresponding to a plurality of cycles of the engine;
   identifying components of the electrical signal corresponding to alternator poles in the engine wherein identifying components of the electrical signal associated with alternator poles comprises performing a fast Fourier transform of the electrical signal to identify a frequency of diode ripple harmonic energy;
   filtering the electrical signal with a bandpass filter around the identified frequency to provide a filtered electrical signal;
   normalizing an amplitude of the filtered electrical signal;
   tracking a peak of the filtered electrical signal;
   generating engine speed estimates in response to the peak of the filtered electrical signal; and
   analyzing anomalies in the engine speed estimates to identify misfire activity in the engine.

7. The method of claim 6, further comprising filtering the electrical signal to reduce DC components in the electrical signal.

8. The method of claim 6, further comprising filtering the electrical signal using a median filter to reduce impulse noise in the electrical signal.

9. The method of claim 8, further comprising filtering the electrical signal using a bandpass filter to precondition the electrical signal.

10. The method of claim 6, further comprising determining accelerations of the engine due to cylinder firings derived from the engine speed estimates.

11. The method of claim 10, further comprising determining changes in energy associated with the accelerations of the engine due to cylinder firings, and identifying misfire activity when a change in energy of the engine associated with the accelerations of the engine due to cylinder firings is less than a predetermined amount.

12. The method of claim 6, wherein the electrical signal comprises a 12 Volt signal associated with the engine.

13. The method of claim 6, Wherein tracking the peak of the filtered electrical signal comprises performing a short terra fourier transform analysis on the electrical signal centered on the identified frequency.

14. The method of claim 13, further comprising generating a diode ripple harmonic frequency ratio by obtaining a coarse engine speed trace, dividing the coarse engine speed trace by an average frequency value to obtain a frequency ratio estimate, and multiplying the frequency ratio estimate by a frequency obtained by the short term fourier transform analysis.

15. The method of claim 6, wherein tracking the peak of the filtered electrical signal comprises performing Teager-Kaiser energy operator analysis on the electrical signal.

16. A method of analyzing an engine for misfire activity, comprising:
   receiving an electrical signal associated with the engine;
   detecting AC ripple in the electrical signal;
   generating engine speed estimates in response to the detected AC ripple; and
   analyzing anomalies in the engine speed estimates to identify misfire activity in the engine;

wherein detecting the AC ripple in the electrical signal comprises performing a fast fourier transform of a sample of the electrical signal less than 20 ms long and identifying peaks in a spectrum of a bandpass signal of the electrical signal at a frequency between 700 Hz and 4000 Hz;

the method further comprising removing amplitude variations from the sample of the electrical signal by forming an envelope between peaks in the bandpass electrical signal and normalizing the electrical signal with respect to the envelope.

17. The method of claim 16, wherein the envelope comprises a piecewise spline between peaks in the bandpass electrical signal.

18. The method of claim 17, wherein the envelope comprises a linear envelope.

19. The method of claim 16, wherein generating the engine speed estimates comprises performing a short time fourier transform analysis on the electrical signal to generate a frequency domain signal, and tracking changes in location of spectrum peaks over time in response to changes in the frequency domain signal.

20. The method of claim 19, further comprising performing frequency domain autocorrelation in at least one short time Fourier transform frame to reduce noise therein.

21. The method of claim 16, further comprising:
identifying anomalies in the engine speed by comparing heights of peaks in the engine speed relative to preceding valleys in the engine speed.

22. The method of claim 21, further comprising smoothing the frequency domain signal, wherein identifying anomalies in the engine speed is performed on a smoothed version of the frequency domain signal.

23. The method of claim 16, wherein the AC ripple comprises harmonic components of a spark signal and/or harmonics components of an exhaust signal.

* * * * *